(12) United States Patent
Northman et al.

(10) Patent No.: US 6,870,655 B1
(45) Date of Patent: Mar. 22, 2005

(54) REARVIEW MIRROR WITH DISPLAY

(75) Inventors: Bradley L. Northman, Belmont, MI (US); John W. Carter, Holland, MI (US); Frederick T. Bauer, Holland, MI (US)

(73) Assignee: Gentex Corporation, Zeeland, MI (US)

( * ) Notice: Subject to any disclaimer, the term of this patent is extended or adjusted under 35 U.S.C. 154(b) by 0 days.

(21) Appl. No.: 09/586,813

(22) Filed: Jun. 5, 2000

Related U.S. Application Data

(63) Continuation-in-part of application No. 09/311,029, filed on May 13, 1999, now Pat. No. 6,170,956, which is a continuation-in-part of application No. 09/172,393, filed on Oct. 14, 1998, now abandoned.

(51) Int. Cl.[7] .............................. G02F 1/15; G02B 5/08; B60R 1/04; B60R 1/12; G09F 13/12
(52) U.S. Cl. .................. 359/265; 359/267; 359/603; 359/839; 340/815.45; 340/815.53; 340/815.56; 340/815.65; 362/29; 362/140; 362/494; 362/545; 362/800; 40/219; 40/447; 40/452; 40/581
(58) Field of Search ................. 340/815.45, 815.53, 340/815.56, 815.65; 362/23, 29, 30, 800, 140, 494, 545; 359/608, 603, 839, 265, 267; 40/219, 447, 452, 581

(56) References Cited

U.S. PATENT DOCUMENTS

| | | | |
|---|---|---|---|
| 1,522,241 A | | 1/1925 | Hennessey |
| 2,190,123 A | | 2/1940 | Pace |
| 3,266,016 A | | 8/1966 | Maruyama et al. |
| 3,300,867 A | | 1/1967 | Sampson |
| 3,680,951 A | | 8/1972 | Jordan et al. |
| 3,795,067 A | * | 3/1974 | Weinstein .......... 434/345 |
| 4,012,632 A | * | 3/1977 | Stone |
| 4,309,828 A | | 1/1982 | Sakamoto |
| 4,425,717 A | | 1/1984 | Marcus |
| 4,499,451 A | | 2/1985 | Suzuki et al. |
| 4,580,875 A | | 4/1986 | Bechtel et al. |
| 4,581,827 A | | 4/1986 | Higashi |
| 4,588,267 A | | 5/1986 | Pastore |
| 4,630,904 A | | 12/1986 | Pastore |
| 4,635,033 A | | 1/1987 | Inukai et al. |
| 4,694,583 A | | 9/1987 | Blaney |
| 4,707,788 A | | 11/1987 | Tashiro et al. |
| RE32,576 E | | 1/1988 | Pastore |

(List continued on next page.)

FOREIGN PATENT DOCUMENTS

| | | |
|---|---|---|
| EP | 0937601 A2 | 8/1999 |
| WO | 8202448 | 7/1982 |
| WO | WO9748134 | 12/1997 |

OTHER PUBLICATIONS

Ward's Auto World Advertisement, Gentex Corporation, Jul. 1997.
U.S. Appl. No. 09/244,726, filed May 17, 1999, DeLine et al.
U.S. Appl. No. 09/025712, filed Feb. 18, 1998, DeLine et al.

*Primary Examiner*—Ricky D. Shafer
(74) *Attorney, Agent, or Firm*—Price, Heneveld, Cooper, DeWitt & Litton, LLP

(57) ABSTRACT

A mirror includes a housing, a mirror subassembly including a reflector layer with a portion defining an opening, and an indicia panel covering the opening and configured to form a visual display. At least one light source is positioned in the housing to pass light through the indicia panel and the opening of the mirror subassembly to selectively illuminate the visual display. The at least one light source emits a light matched in color to the indicia panel so that a maximum of light from the at least one light source passes through the indicia panel and is visible to a vehicle driver. Optimally, the light sources emit an amber colored light, and the indicia panel includes a diffusing layer also having an amber color.

22 Claims, 16 Drawing Sheets

U.S. PATENT DOCUMENTS

| | | | | |
|---|---|---|---|---|
| 4,803,599 A | * | 2/1989 | Trine et al. | 362/249 |
| 4,874,228 A | | 10/1989 | Aho et al. | |
| 4,882,565 A | * | 11/1989 | Gallmeyer | 340/461 |
| 4,902,108 A | | 2/1990 | Byker | |
| 4,917,477 A | | 4/1990 | Bechtel et al. | |
| 5,016,996 A | | 5/1991 | Ueno | |
| 5,128,782 A | | 7/1992 | Wood | |
| 5,128,799 A | | 7/1992 | Byker | |
| 5,202,787 A | | 4/1993 | Byker et al. | |
| 5,204,778 A | | 4/1993 | Bechtel | |
| 5,253,109 A | * | 10/1993 | O'Farrell et al. | 250/206 |
| 5,278,693 A | | 1/1994 | Theiste et al. | |
| 5,280,380 A | | 1/1994 | Byker | |
| 5,282,077 A | | 1/1994 | Byker | |
| 5,285,060 A | | 2/1994 | Larson et al. | |
| 5,294,376 A | | 3/1994 | Byker | |
| 5,313,335 A | * | 5/1994 | Gray et al. | |
| 5,416,313 A | * | 5/1995 | Larson et al. | |
| 5,448,397 A | | 9/1995 | Tonar | |
| 5,451,822 A | | 9/1995 | Bechtel et al. | |
| 5,481,409 A | * | 1/1996 | Roberts | 250/205 |
| 5,530,240 A | | 6/1996 | Larson et al. | |
| 5,650,929 A | | 7/1997 | Potter et al. | |
| 5,661,455 A | | 8/1997 | Van Lente et al. | |
| 5,682,267 A | | 10/1997 | Tonar et al. | |
| 5,689,370 A | | 11/1997 | Tonar et al. | |
| 5,691,848 A | | 11/1997 | Van Lente et al. | |
| 5,699,044 A | | 12/1997 | Van Lente et al. | |
| 5,708,415 A | | 1/1998 | Van Lente et al. | |
| D391,214 S | | 2/1998 | Hook et al. | |
| 5,724,187 A | | 3/1998 | Varaprasad et al. | |
| 5,786,772 A | | 7/1998 | Schofield et al. | |
| 5,803,579 A | * | 9/1998 | Turnbull et al. | |
| 5,818,625 A | | 10/1998 | Forgette et al. | |
| 5,883,605 A | | 3/1999 | Knapp | |
| 5,931,566 A | * | 8/1999 | Fraizer | |
| 5,939,168 A | | 8/1999 | Andriash | |
| 6,087,953 A | * | 7/2000 | DeLine et al. | |
| 6,111,683 A | | 8/2000 | Cammenga et al. | |
| 6,139,171 A | * | 10/2000 | Waldmann | |
| 6,144,424 A | | 11/2000 | Okuda et al. | |
| 6,172,613 B1 | * | 1/2001 | DeLine et al. | 340/815.4 |
| 6,215,409 B1 | * | 4/2001 | Blach | |
| 6,222,460 B1 | | 4/2001 | DeLine et al. | |
| 6,300,879 B1 | | 10/2001 | Regan et al. | |
| 6,326,900 B2 | | 12/2001 | DeLine et al. | |
| 6,329,925 B1 | | 12/2001 | Skiver et al. | |
| 6,366,213 B2 | | 4/2002 | DeLine et al. | |
| 6,471,388 B1 | * | 10/2002 | Marsh | |
| 6,572,233 B1 | * | 6/2003 | Northman et al. | |

* cited by examiner

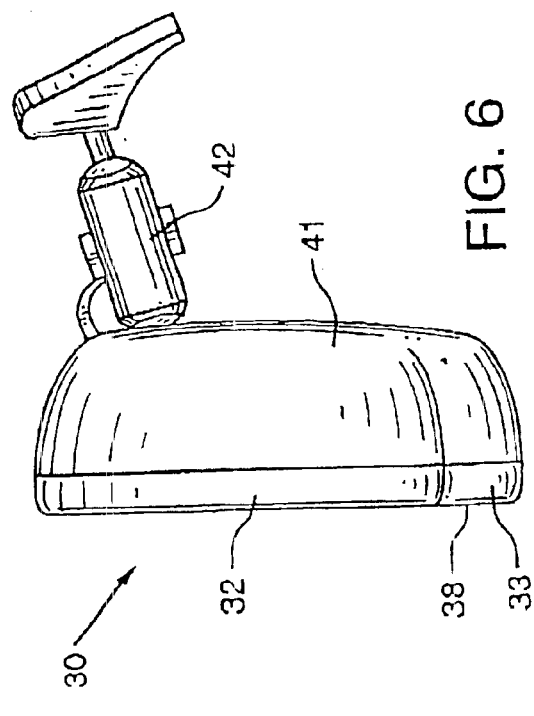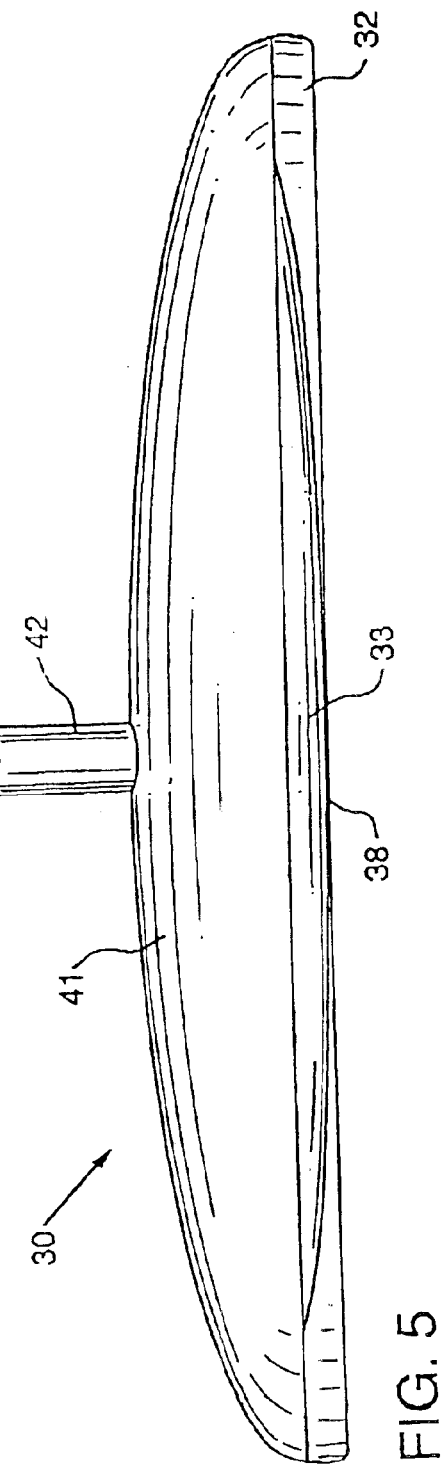

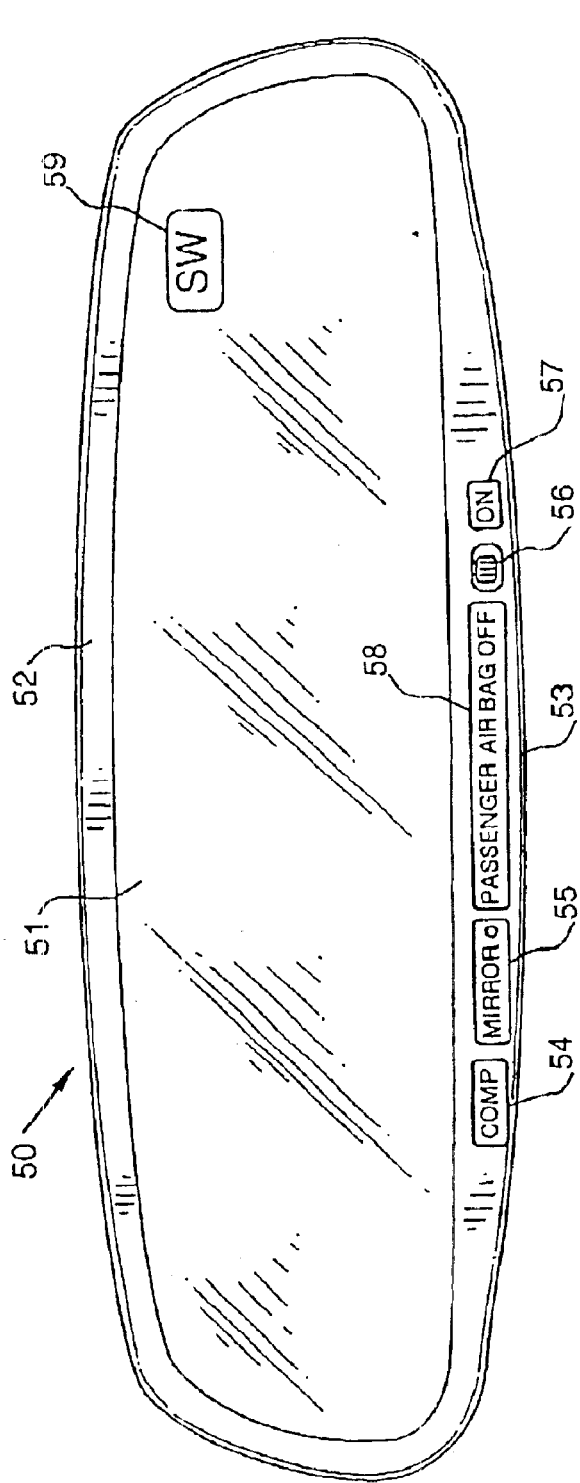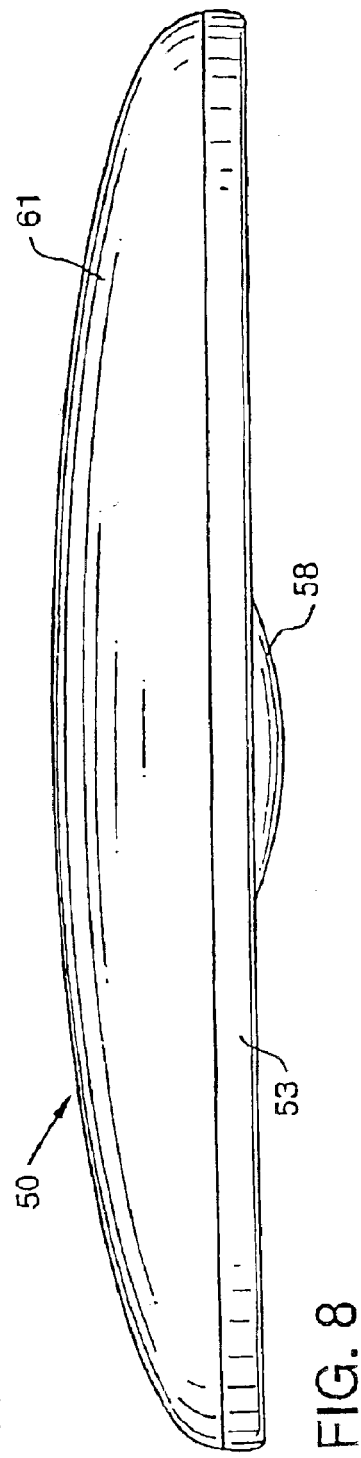
FIG. 7
FIG. 8

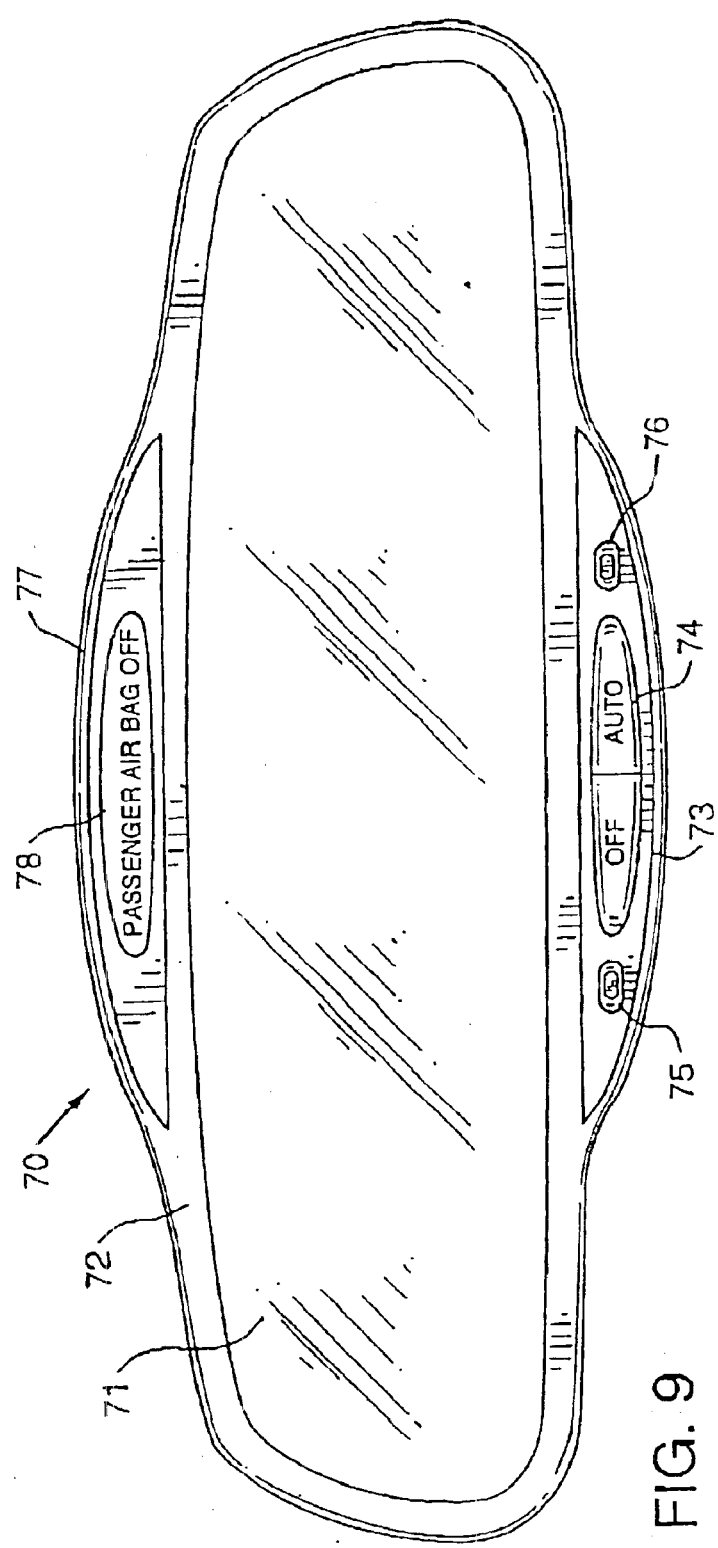
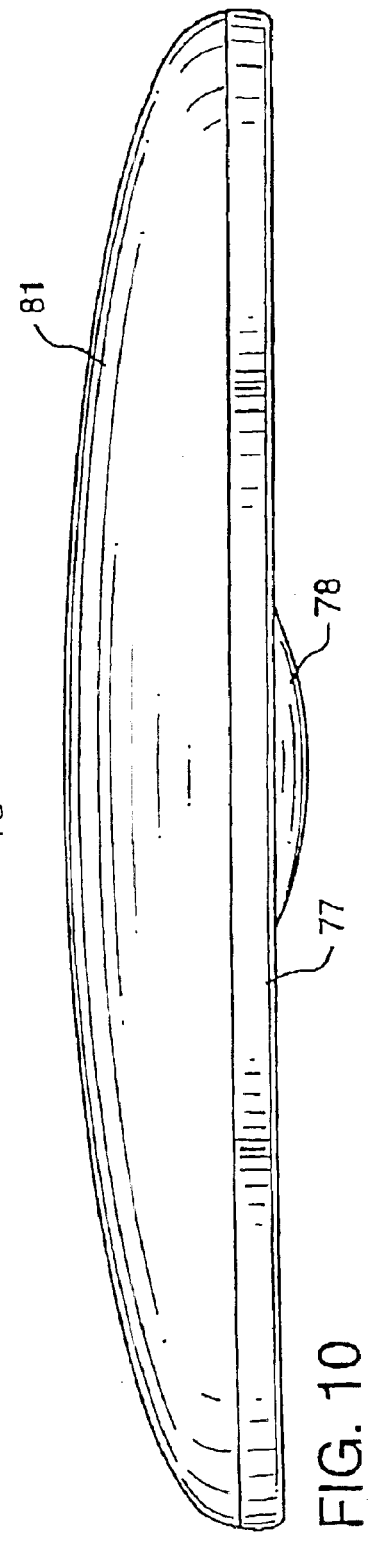
FIG. 9
FIG. 10

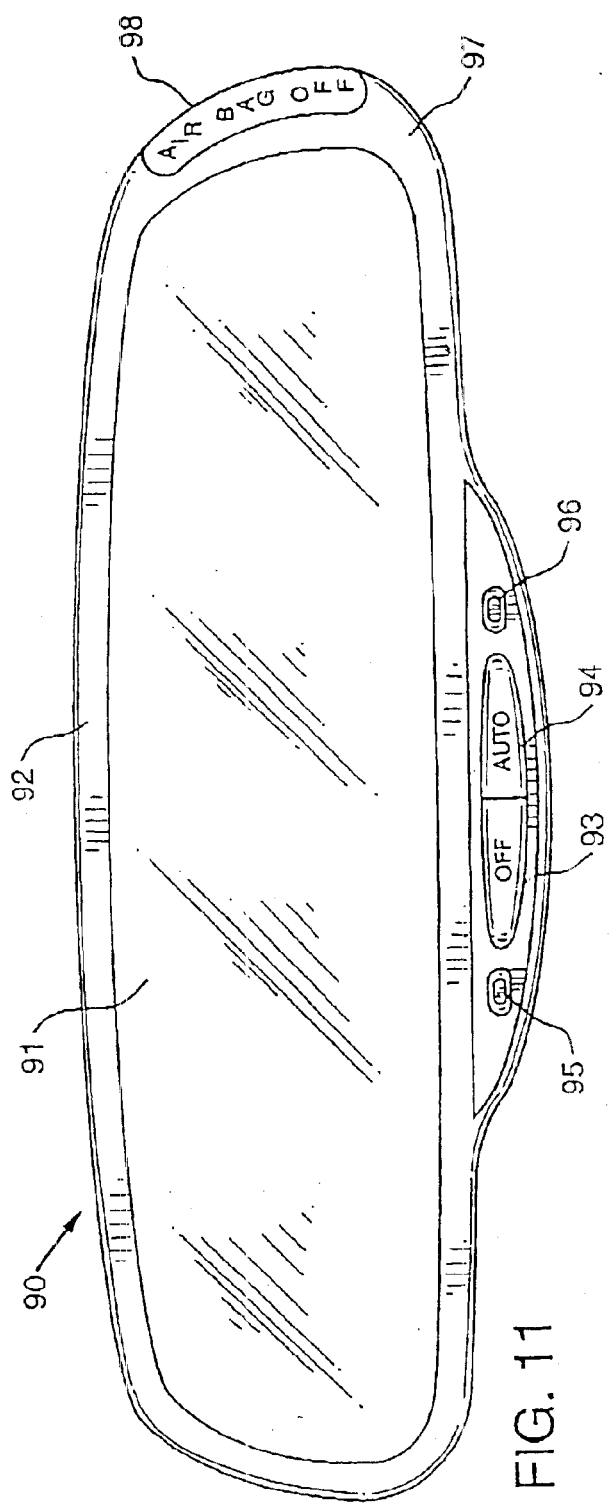
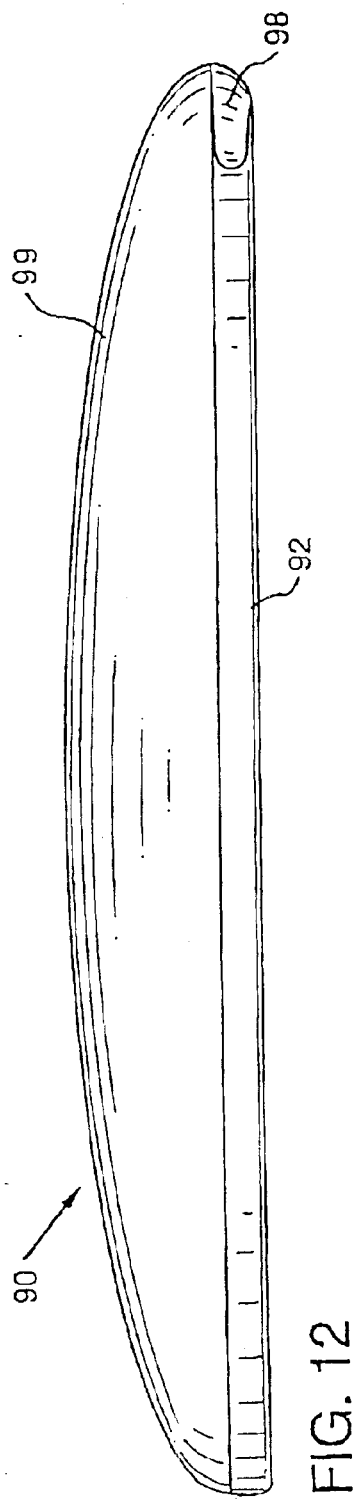
FIG. 11
FIG. 12

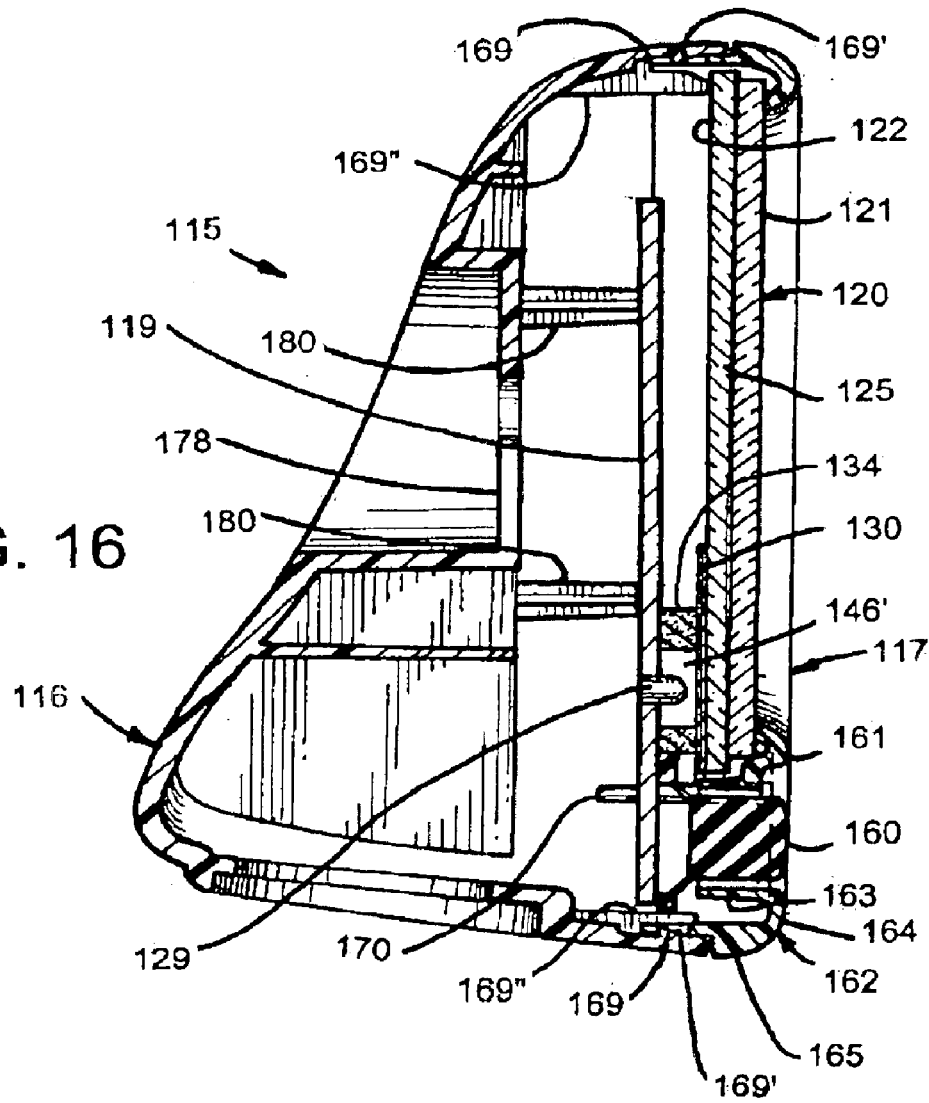

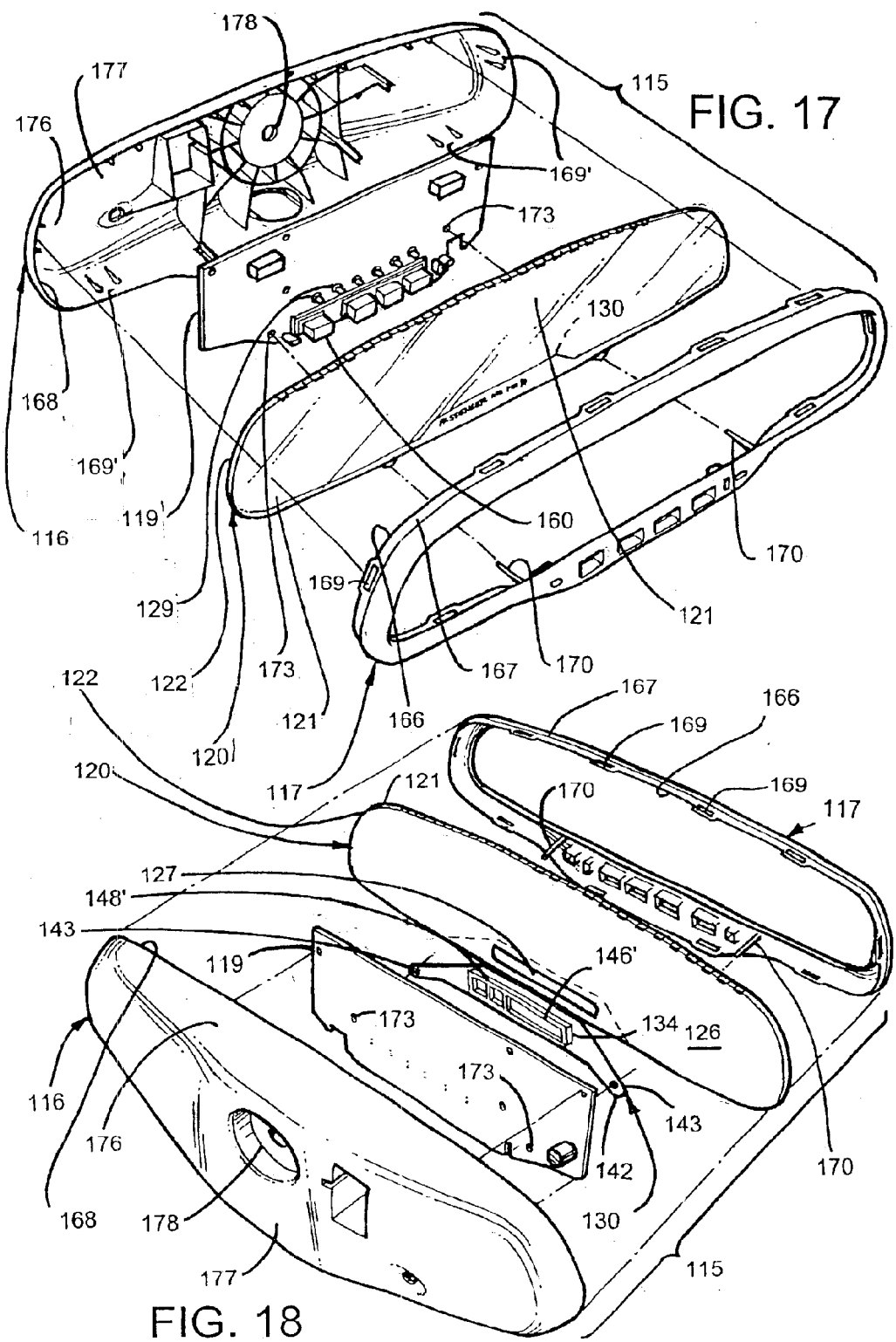

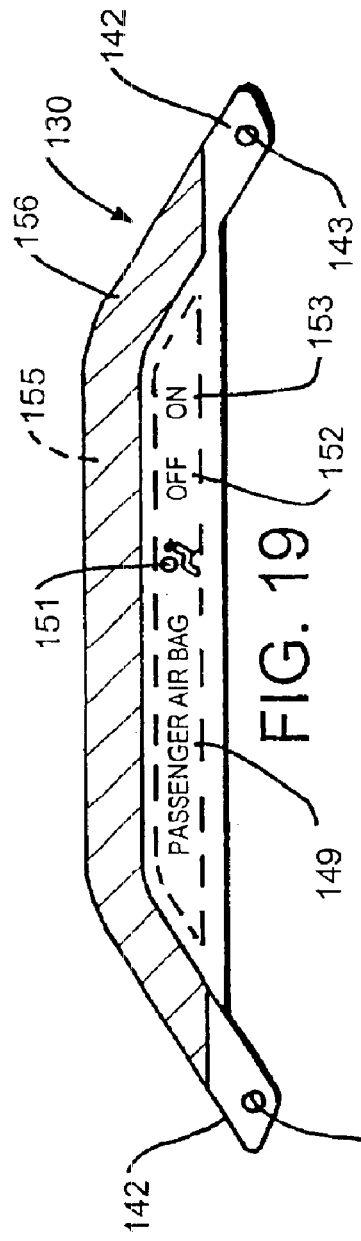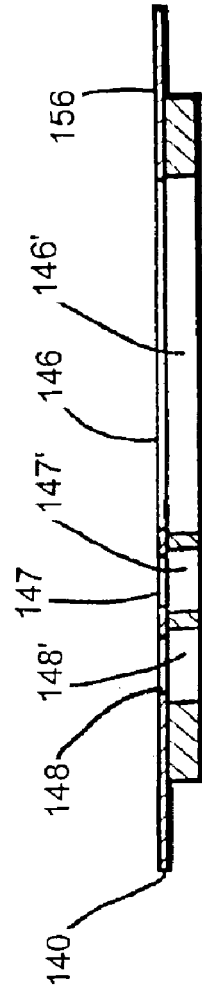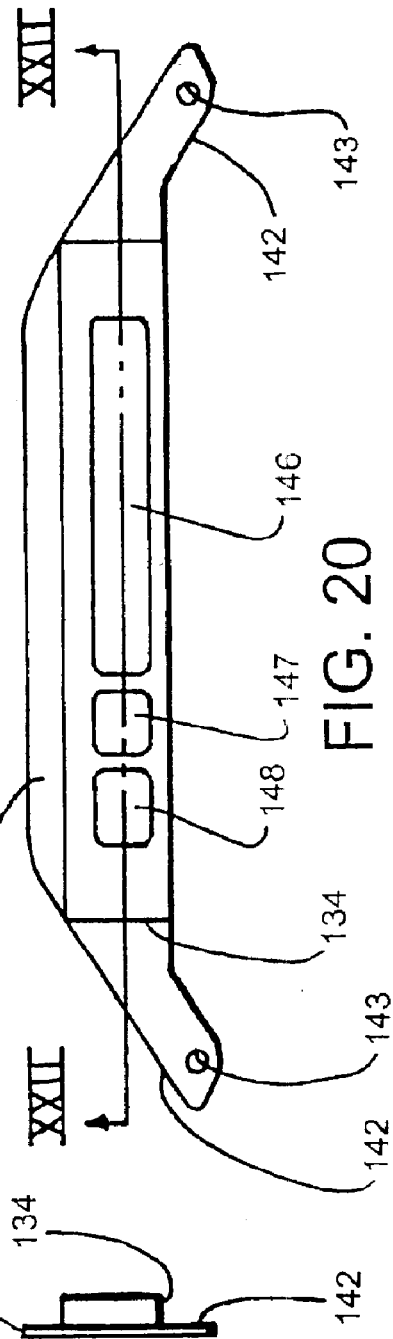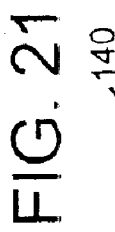

REARVIEW MIRROR WITH DISPLAY

CROSS REFERENCE TO RELATED APPLICATION

This application is a continuation-in-part of co-assigned, application Ser. No. 09/311,029, filed May 13, 1999 now U.S. Pat. No. 6,170,956, entitled REVIEW MIRROR DISPLAY, which is a continuation-in-part of co-assigned, co-invented application Ser. No. 09/172,393, filed Oct. 14, 1998 now abandonded, entitled REARVIEW MIRROR DISPLAY.

FIELD OF THE INVENTION

The present invention relates to vehicle rearview mirrors, and more particularly related to the display of information on a rearview mirror assembly.

BACKGROUND OF THE INVENTION

Modem cars and trucks include rearview mirrors mounted inside and outside of the vehicle. One type of conventional interior rearview mirror comprises a prismatic mirror that can be switched from a first orientation suitable for normal driving conditions to a second orientation, which reduces glare caused by headlights of vehicles approaching from the rear.

Recently, electrochromic rearview mirrors have been developed which automatically change from a full reflectance mode during the day to a partial reflectance mode during the night for glare protection. Electrochromic rearview mirrors typically comprise a relatively thin electro-optic medium sandwiched and sealed between two glass elements. In most assemblies, when the electro-optic medium is electrically energized, it darkens and absorbs an increasing amount of light as the applied voltage is increased. When the electrical voltage is removed, the mirror returns to its clear state. Examples of such automatic rearview mirrors are disclosed in U.S. Pat. Nos. 4,902,108; 4,917,477; 5,128,799; 5,202,787; 5,204,778; 5,278,693; 5,290,380; 5,282,077; 5,285,060; 5,294,376; 5,682,267; 5,689,370; 5,448,397; 5,451,822; and 5,818,625 each of which is assigned to the assignee of the present invention and each of which is incorporated herein by reference.

In the past, information such as the words "HEATED" or "OBJECTS IN MIRROR ARE CLOSER THAN THEY APPEAR" have been used on many vehicle rearview mirrors. In addition, some types of automatic rearview mirrors have included compass and temperature readings. However, such conventional rearview mirror displays typically comprise a glossy planar surface, which makes the display difficult to read. Furthermore, such conventional displays are often difficult or impossible to read by some occupants of a vehicle. For example, interior rearview mirrors are typically angled toward the driver and away from the front seat passenger, thereby obstructing the front seat passenger's ability to see the display. In addition, selectable information displays commonly used in automobile interiors comprise complex electronic assemblies. This type of display is not only expensive, but also more prone to failure due to the number and complexity of components.

In addition to the problems and concerns discussed above with displays on mirrors, there are additional problems that need to be addressed. One way of forming the individual letters of the words "HEATED" and "OBJECTS IN MIRROR . . . " is to apply reflector material to an electrochromic mirror subassembly as a uniform layer, and then selectively remove portions of reflector material to form the shape or image of detailed alphanumeric and symbolic indicia in the reflector material. However, it is difficult to remove the reflector material in a manner that accurately and consistently forms all parts of small letters and symbols, such that the removal process potentially results in significant scrap. This scrap can be very expensive because, not only does a significant percentage of scrap result from imperfect indicia images, but further the mirror subassembly is relatively expensive work-in-process at that point in the manufacturing process. Concurrently, the scrap is difficult to repair.

Another problem is that, even if reflector material is accurately removed to form the indicia image, many manufacturers want color in their displays to improve their customer appeal. Colored translucent labels have been used in the past in vehicles, such as in instrument panels, to create visual displays. However, there are problems with known prior art labels used in the environment of a mirror. For example, stick-on labels using adhesive may partially delaminate from glass mirror element over time, leading to poor appearance where the released adhesive has a discontinuous and patchy appearance. Also, the adhesive can trap air during the installation process, leading to immediate poor appearances or leading to in-service delamination problems as the stick-on label and its carrier are thermally cycled.

Alignment of components and displays in mirrors is another important consideration in regard to customer acceptance. Display information that is non-parallel and angled relative to a perimeter of the mirror can result in a customer forming a very poor opinion of the quality of a vehicle, even though the mirror is fully functional. Further, misalignment can be very aggravating to a customer, because the customer sees the misalignment problem every time they look in the mirror, which occurs every time they are in the vehicle.

Another problem is accurate positioning and retention of a printed circuit board in the mirror housing. Printed circuit boards carry circuits used in electrochromic mirrors to control darkening for glare protection, and also carry other circuits and sensors, such as for daylight sensing, keyless entry signal sensing, information displays, and the like. It is important that the printed circuit board be accurately positioned so that any light sources and sensors carried thereon are accurately located, and so that any control buttons for the mirror that are mounted on the printed circuit board and protrude through a face of the housing are also properly and accurately positioned. Additionally, it is noted that the printed circuit board should be firmly held in a manner preventing rattling, but in a manner not leading to breakage, fracturing, or undue bending or stressing of the printed circuit board during assembly and during thermal cycling while in service.

Another less obvious problem concerns secondary reflections and scattering of light within transparent layers in the mirror subassembly. Electrochromic mirror subassemblies include a pair of transparent elements, such as flat glass elements, with a chamber therebetween. The chamber is filled with electrochromic material that includes a first layer of transparent conductor material and either another layer of transparent conductor (if the mirror subassembly is a fourth surface reflector), or a reflector/electrode (if the mirror subassembly is a third surface reflector). When light is introduced through an opening in the reflector, a primary amount of the light travels through the transparent elements and through the associated layers of electrochromic material without unacceptable distortion. However, a small amount of the light is reflected as the light passes through each of the interfacing surfaces in the mirror subassembly. This can lead to double images (sometimes called "ghosting"), blurred images, shadowing, and/or the occurrence of undesirable scattering of light across a visible face of the mirror subassembly. This is undesirable because it reduces the clarity of the visual display and can, in extreme cases, be interpreted by a customer as a defect.

The present invention has been developed in view of the foregoing, and to address other deficiencies of the prior art.

SUMMARY OF THE PRESENT INVENTION

In one aspect of the present invention, a mirror includes a housing, a mirror subassembly including a reflector layer with a portion defining an opening, and an indicia panel covering the opening and configured to form a visual display. At least one light source is positioned in the housing to pass light through the indicia panel and the opening of the mirror subassembly to selectively illuminate the visual display. The at least one light source emits a light matched in color to the indicia panel so that a maximum of light from the at least one light source passes through the indicia panel and is visible to a vehicle driver.

These and other features, advantages, and aspects of the present invention will be further understood and appreciated by those skilled in the art by reference to the following specification, claims, and appended drawings.

DESCRIPTION OF THE DRAWINGS

FIG. 5 is a bottom view of the rearview mirror of FIG. 4;

FIG. 6 is a side view of the rearview mirror of FIG. 4;

FIG. 7 is a front elevational view of a rearview mirror including a non-planar display in accordance with a further embodiment of the present invention;

FIG. 8 is a bottom view of the rearview mirror of FIG. 7;

FIG. 9 is a front elevational view of a rearview mirror including a non-planar display in accordance with another embodiment of the present invention;

FIG. 10 is a top view of the rearview mirror of FIG. 9;

FIG. 11 is a front elevational view of a rearview mirror including a non-planar display in accordance with a further embodiment of the present invention;

FIG. 12 is a top view of the rearview mirror of FIG. 11;

FIG. 16 is a cross section taken along the line XVI—XVI in FIG. 14,

FIGS. 17 and 18 are front and rear exploded perspective views of the mirror shown in FIG. 14;

FIG. 19 is a front view of the indicia panel shown in FIG. 14;

FIGS. 20 and 21 are rear and side views of the indicia panel shown in FIG. 19;

FIG. 22 is a cross section taken along the line XXI—XXI in FIG. 20;

DETAILED DESCRIPTION OF PREFERRED EMBODIMENTS

Figure 1:
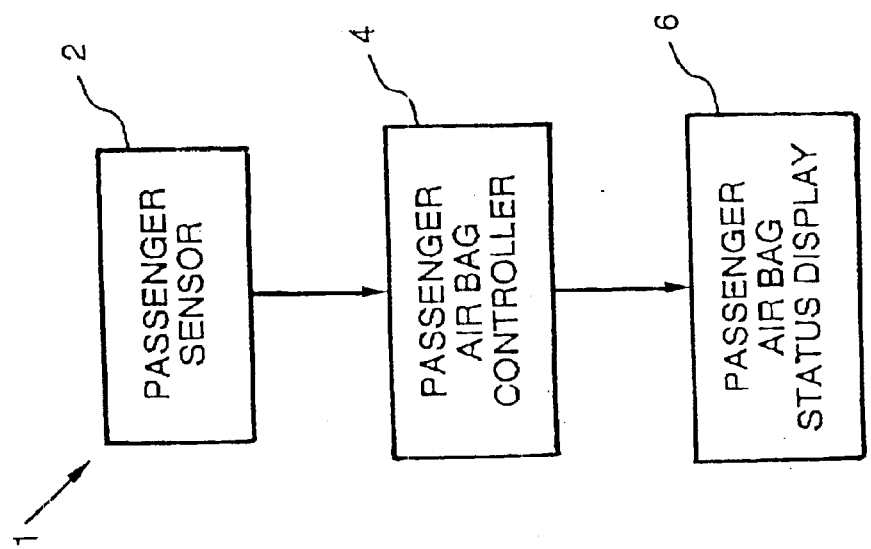
FIG. 1 is a schematic diagram of a vehicle sensor and display system in accordance with an embodiment of the present invention.

FIG. 1 is a schematic diagram illustrating a vehicle sensor and display system 1 in accordance with an embodiment of the present invention. The system 1 includes a passenger sensor 2, a passenger air bag controller 4, and a passenger air bag status display 6. Alternatively, the display system could include a manual air bag shutoff switch in place of, or in addition to, the passenger sensor 2 and the air bag controller 4.

The passenger sensor 2 is used to determine whether a passenger is located at a particular position in a vehicle. For example, the passenger sensor 2 may be used to determine whether a passenger is seated in the right front passenger seat of a car or the like. The passenger sensor 2 may be used to determine the approximate size of a passenger in order to allow deactivation of the passenger's air bag if the passenger is less than a particular size. The sensor 2 may also be used to determine whether an infant or child seat is present and to deactivate the air bag if such an infant or child seat is detected. Examples of suitable passenger sensors 2 include conventional infrared sensors, pressure sensors, and the like.

As shown in FIG. 1, the passenger sensor 2 is connected to the passenger air bag controller 4. Based on the signal provided by the passenger sensor 2, the controller 4 switches the passenger air bag on when a suitable size person is positioned in the passenger seat, and switches the air bag off when there is no passenger in the seat. Alternatively, the air bag status display 6 may be connected directly to the passenger sensor 2. Furthermore, the air bag display 6 may be connected to a manual air bag shutoff switch (not shown). The passenger air bag controller 4 is connected to the passenger air bag status display 6, as schematically shown in FIG. 1.

In accordance with the present invention, the passenger air bag status display 6 is located on a rearview mirror assembly. The display 6 may include any suitable indicia which alerts occupants of the vehicle that the passenger air bag is either active or inactive. For example, the display 6 may illuminate the words "PASSENGER AIR BAG OFF" when the passenger air bag has been deactivated by the controller 4 or by a manual switch. Alternatively, the display 6 may include any other symbols and/or alphanumeric characters, which adequately convey information concerning the status of the passenger air bag to at least one occupant of the vehicle.

In accordance with the preferred embodiment of the present invention, the display 6 is located on the interior rearview mirror assembly of a vehicle. Vehicle drivers generally look at the interior rearview mirror very frequently. This frequent use makes the interior rearview mirror an optimal location for the display of critical safety information, such as air bag status. By displaying safety information on the interior rearview mirror assembly, the driver or other occupants of the vehicle may be alerted to critical information, which could otherwise go unnoticed.

Examples of suitable displays include LED, vacuum-fluorescent, and LCD displays. The display may comprise a filter with words such as "AIR BAG," an air bag symbol displayed on a surface which would become visible, more apparent, or change color when the display is illuminated or backlighted, or an indicator light or series of lights in a location relative to a symbol or text indicative of an air bag, which would announce the activation or deactivation of the air bag system by a change of status or color of the light(s). These indicators and displays could be located on the assembly supporting and encasing the mirror, in a module supported by but not integral with the mirror assembly, or in the mirror surface, as more fully described below.

Figure 2:
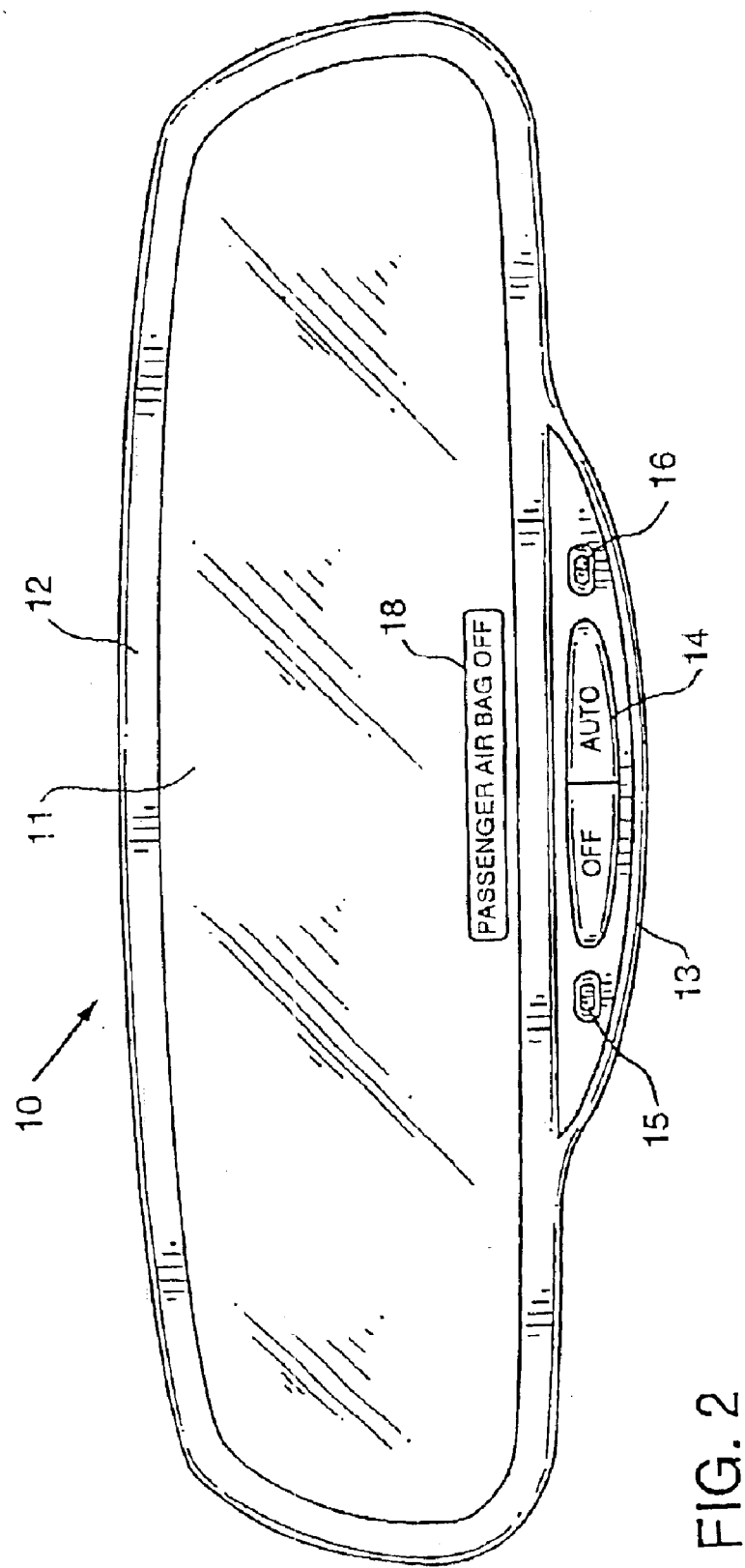
FIG. 2 is a front elevational view of a rearview mirror including a passenger air bag status display in accordance with an embodiment of the present invention.

FIG. 2 is a front elevational view of a rearview mirror 10 in accordance with an embodiment of the present invention. The rearview mirror 10 includes a mirror surface 11 surrounded by a bezel 12. In the embodiment shown in FIG. 2, the rearview mirror 10 is an automatic interior electrochromic mirror. However, other types of rearview mirrors including exterior mirrors and prismatic interior mirrors may be provided in accordance with the present invention.

As shown in FIG. 2, a chin 13 is located at the bottom of the bezel 12. A switch 14 may be provided inside the chin 13 in order to turn the automatic electrochromic rearview mirror 10 on or off. A conventional light sensor 15 may be located in the chin 13 or at any other suitable location. In addition, an indicator 16 located in the chin 13 is used to indicate whether the electrochromic rearview mirror 10 is on or off. Typically, the indicator 16 includes a light, which is illuminated when the electrochromic rearview mirror 10 is on.

In the embodiment of FIG. 2, a passenger air bag status display 18 is located in the mirror surface 11. The display 18 includes the words "PASSENGER AIR BAG OFF." However, any other suitable symbolic or alphanumeric indicia which adequately convey the status of the passenger air bag may be used.

In the case of the mirror surface display 18, any suitable display can be located in or behind the mirror for viewing through the mirror assembly. The display 18 may comprise a substantially transparent section in the mirror. Part or the entire reflective surface may be removed from a selected area. An indicator light source is positioned behind the selected area. Removal of any other opaque elements in the aforementioned area is also desirable so that the indicator or display can be viewed through the mirror. The removal of the reflective surface could create an indicator graphic pattern where desired. For example, the words "PASSENGER AIR BAG OFF" could be etched away from the reflective surface partially or completely to allow transmission of light from a light source through the graphic pattern to thereby indicate the status of the air bag system.

Figure 3:
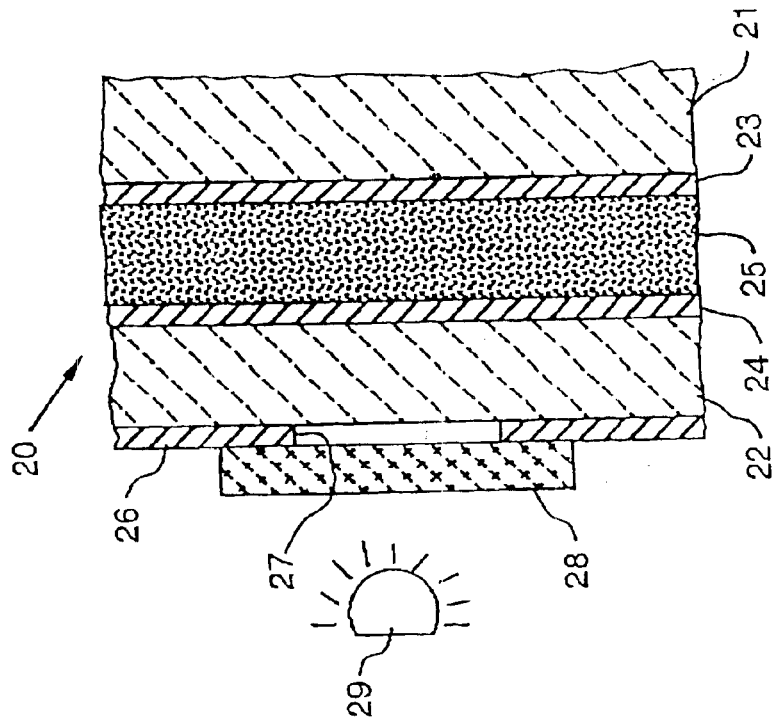
FIG. 3 is a partially schematic, side-sectional view illustrating a rearview mirror display in accordance with an embodiment of the present invention.

FIG. 3 is a partially schematic side sectional view showing one type of rearview mirror display assembly 20 that may be used in the rearview mirror 11 of FIG. 2. The rearview mirror display assembly 20 includes a first glass sheet 21 which forms a viewing surface facing the occupant of a vehicle. The viewing surface of the first glass sheet 21 may be smooth or may be provided with a matte texture. A second glass sheet 22 is spaced from the first glass sheet 21. A substantially transparent, electrically conductive layer 23 covers the interior side of the first glass sheet 21, while another substantially transparent, electrically conductive layer 24 covers the interior of the second glass sheet 22. An electrochromic composition 25 fills the gap between the glass sheets 21 and 22. A reflective layer 26 made of any suitable material, such as silver, is provided on the surface of the second glass sheet 22. The display assembly 20 is thus provided as a part of an electrochromic rearview mirror. The various components of the electrochromic rearview mirror may be arranged and constructed as disclosed in the previously cited U.S. patents incorporated herein by reference.

As shown in FIG. 3, a portion of the reflective layer 26 is removed from the glass sheet 22 in order to provide an opening 27. An indicia panel 28 covers the opening 27. A light source 29 is arranged such that upon illumination, light travels through the indicia panel 28, opening 27, and the remaining layers 21–25 of the electrochromic mirror assembly toward the occupant of the vehicle. The indicia panel 28 may be unmarked or may comprise any desired indicia, such as alphanumeric symbols or the like. The indicia panel 28 may optionally comprise a color filter. The light source 29 may comprise any suitable type of illuminator, such as an LED, LCD, vacuum-fluorescent element, incandescent light, or the like.

The display 18 may thus be part of the silver coating that is etched/removed to form the 25 individual letters or components of the graphics through which the light would pass to illuminate the lettering or graphics. The display 18 may further comprise lettering or graphics printed or otherwise applied to a cleared area in the silver where the graphics or lettering would be of a design to show contrast when illuminated. The graphics or display can be separate from the mirror element mounted behind the element, such as a conventional LCD display, a vacuum-fluorescent display, a static mask through which light will pass to display graphics or lettering, or other display types.

A color filter may optionally be included between the display light source and the viewer, such as a color filter printed or bonded to the mirror surface, or a filter installed on the light source, or at any point therebetween. The light source could also be of a bandwidth narrower than full-spectrum visible light for the purpose of displaying a distinctive color through the display graphics to indicate the status of the air bag system.

In versions requiring removal of some of the silver surface, a portion rather than all of the silver can be removed in an area and still allow the display to be seen. One method is to remove a pattern, such as a grid. This allows conduction across a substantial amount of the surface facilitating coloring and clearing of the electrochromic substance in that area proportional to the rest of the element. Another method is to allow breaks in letters and graphics to avoid closed islands in the surface.

In the embodiment of FIG. 2, the surface of the display 18 is flush with the surface of the mirror 11. Alternatively, the surface of the display 18 may be non-planar. For example, the surface of the display 18 may comprise a convex arc extending from the surface of the mirror 11.

In accordance with a preferred embodiment of the present invention, a non-planar display is provided on a rearview mirror assembly. As used herein, the term "non-planar display" means a display having a contoured exterior viewing surface instead of a flat exterior surface. Preferred non-planar contoured display surfaces include curved or faceted convex configurations.

Figure 4:
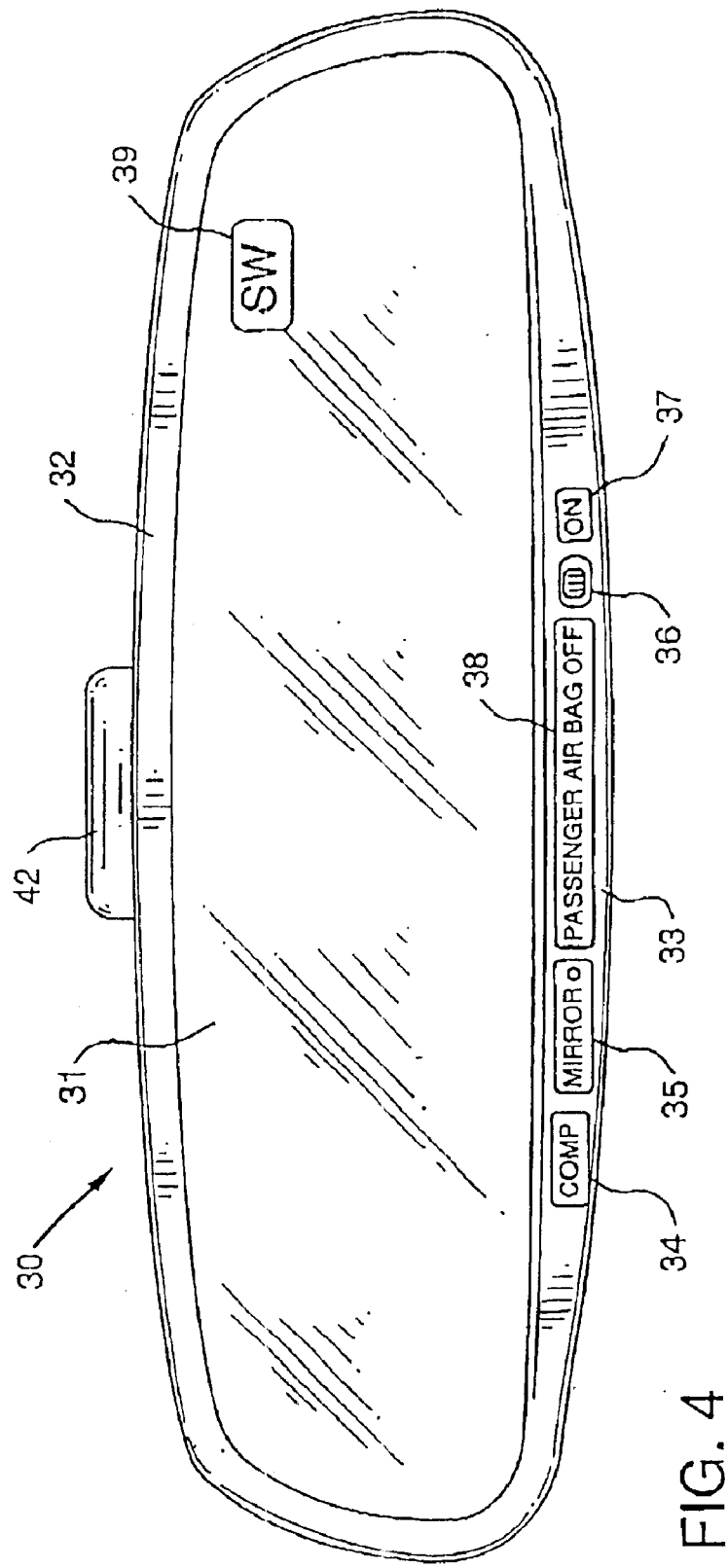
FIG. 4 is a front elevational view of a rearview mirror including a non-planar display in accordance with another embodiment of the present invention.

FIGS. 4–6 illustrate a rearview mirror 30 having a non-planar display in accordance with a preferred embodiment of the present invention. The rearview mirror 30 is an automatic electrochromic mirror including a mirror surface 31 and a bezel 32. Although an electrochromic mirror is shown in FIGS. 4–6, other types of mirrors, such as prismatic rearview mirrors, are within the scope of the present invention. A contoured chin 33 having a curved front face is located at the bottom of the bezel 32. The contoured chin 33 houses a compass switch 34, a mirror switch 35, a light sensor 36, and an on/off indicator 37. In this embodiment, a non-planar display 38 is located in the chin 33. As shown most clearly in FIG. 5, the surface of the non-planar display 38 is convex and conforms to the contoured surface of the chin 33.

The use of a convex non-planar display 38 provides substantially improved viewability of the information provided by the display. The curved exterior surface of the display 38 essentially prevents unwanted glare from surrounding light sources and provides improved viewability to occupants of the vehicle. For example, both the driver and front passenger(s) of the vehicle can readily see the information provided by the display 38 without obstruction. In a preferred embodiment, the non-planar surface of the display 38 has a matte texture in order to further reduce unwanted glare.

A display, such as a vacuum-fluorescent, LCD, LED, or the like, may be mounted in the bezel or, preferably, behind a filter in the bezel. A static display may simply be illuminated or the illumination color changed to display information. This display offers several possible configurations. A preferred display comprises an opening in the bezel and a mask or label with graphics and/or lettering printed onto the surface to allow light to pass through the lettering or graphics portion of the label. Lettering or graphics molded or embossed into the bezel through which light could pass to illuminate the lettering or graphics may be used. A translucent bezel or portion of the bezel on which the graphics could be painted or printed to allow light to pass through only select parts may also be used. Furthermore, printed or molded graphics or lettering with a corresponding translucent or open section through which light could pass to indicate status may be used. In addition, a status display of graphics and/or lettering with a corresponding light which illuminates or changes color may be used.

In the embodiment shown in FIGS. 4–6, the rearview mirror 30 includes a compass reading 39, which indicates the direction in which the vehicle is oriented. The compass switch 34 may be used to turn the compass reading 39 on and off. As shown most clearly in FIGS. 5 and 6, the rearview mirror 30 includes a housing 41 and a conventional mounting bracket 42. However, other mounting methods can be used.

FIGS. 7 and 8 illustrate a rearview mirror 50 in accordance with another embodiment of the present invention. The electrochromic rearview mirror 50 includes a mirror surface 51 and a surrounding bezel 52. A chin 53 having a generally planar front face extends from the bottom of the bezel 52. The chin 53 houses a compass switch 54, a mirror switch 55, a light sensor 56, and an on/off indicator 57. A convex non-planar display 58 extends from the surface of the chin 53. A compass display window 59 is provided in the mirror surface 51. The rearview mirror 51 also includes a housing 61. The convex surface of the non-planar display 58 shown in FIGS. 7 and 8 substantially improves visibility of the displayed message.

FIGS. 9 and 10 illustrate a rearview mirror 70 in accordance with a further embodiment of the present invention. The electrochromic rearview mirror 70 includes a mirror surface 71 surrounded by a bezel 72. A chin 73 located at the bottom of the bezel 72 includes a mirror switch 74, a light sensor 75, and an on/off mirror indicator 76. A crown 77 having a substantially planar front surface is located at the top of the bezel 72. A convex non-planar display 78 is located in the crown 77. The rearview mirror 70 also includes a housing 81.

FIGS. 11 and 12 illustrate another rearview mirror 90 in accordance with a further embodiment of the present invention. The rearview mirror 90 includes a mirror surface 91 surrounded by a bezel 92. A chin 93 located at the bottom of the bezel 92 houses a mirror switch 94, a light sensor 95, and an on/off mirror indicator 96. The right side of the bezel 92 includes an extension 97 having a non-planar display 98 therein. The rearview mirror 90 comprises a housing 99. In this embodiment, the non-planar display 98 is oriented such that a passenger seated in the front right seat of a vehicle can easily see whether the passenger air bag is on or off.

Figure 13:
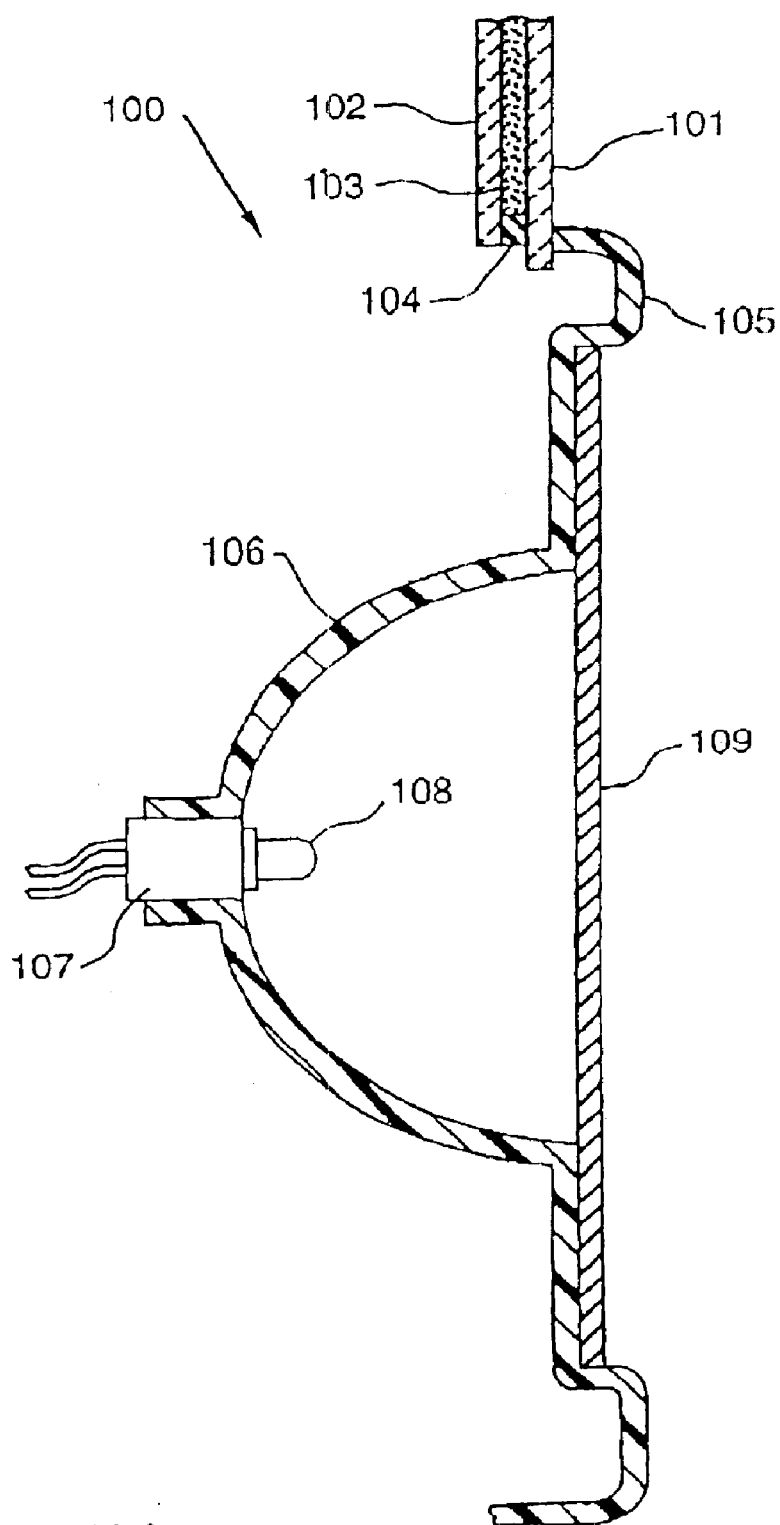
FIG. 13 is a partially schematic, side-sectional view illustrating a rearview mirror display in accordance with an embodiment of the present invention.

FIG. 13 is a partially schematic side sectional view illustrating a rearview mirror non-planar display assembly 100 in accordance with an embodiment of the present invention. The non-planar display assembly 100 includes an electrochromic mirror assembly comprising a first glass sheet 101, a second glass sheet 102 spaced from the first glass sheet 101, and an electrochromic material 103 filling the gap between the glass sheets 101 and 102. A seal 104 extends between the glass sheets 101 and 102 in order to retain the electrochromic material 103 therebetween. Although not shown in FIG. 13, the electrochromic mirror assembly may include substantially transparent electrically conductive films on the interior surfaces of the glass sheets 101 and 102, and may comprise a reflective mirror surface positioned at any suitable location, such as the exterior surface of the second glass sheet 102. Suitable types of electrochromic rearview mirror assemblies are disclosed in the previously cited U.S. patents which are incorporated herein by reference.

As shown in FIG. 13, a bezel 105 contacts the exterior viewing surface of the first glass sheet 101 of the electrochromic mirror assembly. A lamp holder 106 having a reflective interior surface is formed in the bezel 105. A light source assembly 107 is secured in the lamp holder 106. In the embodiment shown in FIG. 13, an LED 108 is provided as part of the light source assembly 107. Alternatively, any other suitable light source, such as an electroluminescent source, incandescent light, or the like, may be used. An indicia panel 109 covers the lamp holder 106. The indicia panel 109 forms the exterior viewing surface of the display. In accordance with the preferred embodiment of the present invention, the indicia panel 109 comprises a convex exterior viewing surface defined by at least one radius of curvature, as more fully described below.

The indicia panel 109 shown in FIG. 13 may be unmarked or may comprise any desired graphics, alphanumeric symbols, or the like. The indicia panel 109 may optionally include a color filter.

Preferred non-planar displays of the present invention comprise a convex exterior viewing surface defined by at least one radius of curvature. The radius of curvature may be constant or may vary along the exterior surface of the display. For example, in the embodiments shown in FIGS. 4–10, the non-planar displays have an exterior curved surface of substantially constant radius defined by an arc swept around a substantially vertical axis. Such arcs are most readily seen in FIG. 8, element 58 and in FIG. 10, element 78. The radius of the arc typically ranges from about 1 cm to about 60 cm, and more preferably from about 1.5 cm to about 15 cm. This geometry results in a display that is readily viewed by all occupants of the vehicle while reducing unwanted glare.

In the embodiments of FIGS. 11 and 12, the non-planar display has a varying radius of curvature, which substantially conforms to the curved bezel surface of the mirror. The non-planar display reduces glare and is readily viewable to at least the right front passenger of the vehicle.

Conventional planar displays have a high degree of first surface reflection, which decreases the contrast between the graphics of the display which are intended to be viewed and the reflected light from the surface. This degrades the ability for a passenger to view the displayed information, since the front seat passenger is usually seated in a position which can create a viewing angle up to 30 degrees or more off of perpendicular to the mirror front surface. A non-planar display, as well as surface treatment such as a matte finish to decrease the reflection of the surface, increases the contrast of the display, especially when viewed at an angle. The curvature or the display also serves to orient the display or a portion of the display toward the passenger and, therefore, improve the visibility of the display. A low-glare surface and a convex display surface have the added benefit of reducing glare on the display surface for the driver and other occupants of the vehicle. Additionally, since the display surface is typically at the same angle as the mirror surface, glare from the headlamps of a following vehicle can also render a glossy, planar display unreadable.

Although the non-planar displays described in the specific embodiments herein are used to convey information concerning the status of a passenger air bag, other types of symbolic or alphanumeric information may be displayed on rearview mirror assemblies in accordance with the present invention. For example, the status of other air bags or supplemental restraint systems in the vehicle may be displayed. Furthermore, information such as door ajar, fasten seat belts, fuel mileage, time, temperature, heading, altitude, and the like may be displayed.

Modification

Figure 14:
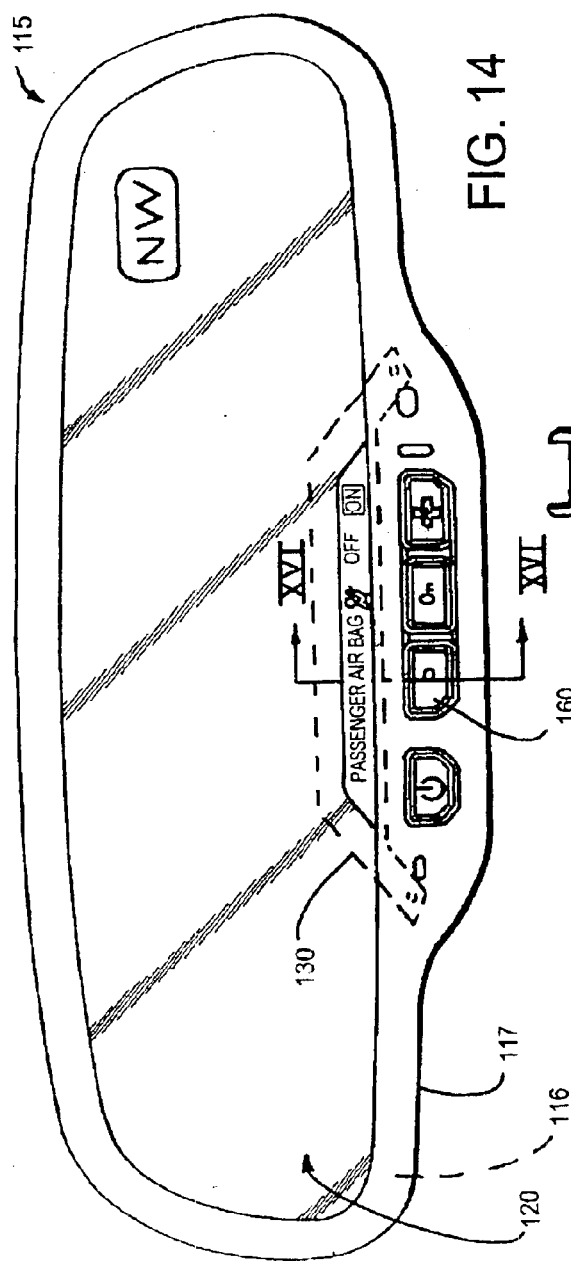
FIGS. 14 and 15 are front and bottom views of another embodiment of the present invention, including a particularly shaped indicia panel.

A mirror assembly 115 (also referred to herein as "mirror 115" herein) (FIGS. 14 and 15) a includes a housing 116 and a bezel 117 defining a cavity 118, and further includes an electrochromic mirror subassembly 120 (FIG. 25) supported in the cavity 118 along with a printed circuit board 119. The printed circuit board 119 has a circuit thereon that is configured to operate the electrochromic mirror subassembly 120 for controlled darkening to reduce glare in the mirror 115. An indicia panel 130 (sometimes called an "applique") is attached to a rear of the mirror subassembly 120 or bezel 117 to provide a low cost, highly attractive lighted display on the mirror 115. The indicia panel 130 is constructed to be exceptionally attractive and effective, as described below. The indicia panel 130 is constructed with locator-engaging details that facilitate its alignment on the mirror subassembly 120, and further that provide alignment of the mirror subassembly 120 on the bezel 117 and in the housing 116, as also disclosed below.

Figure 23:
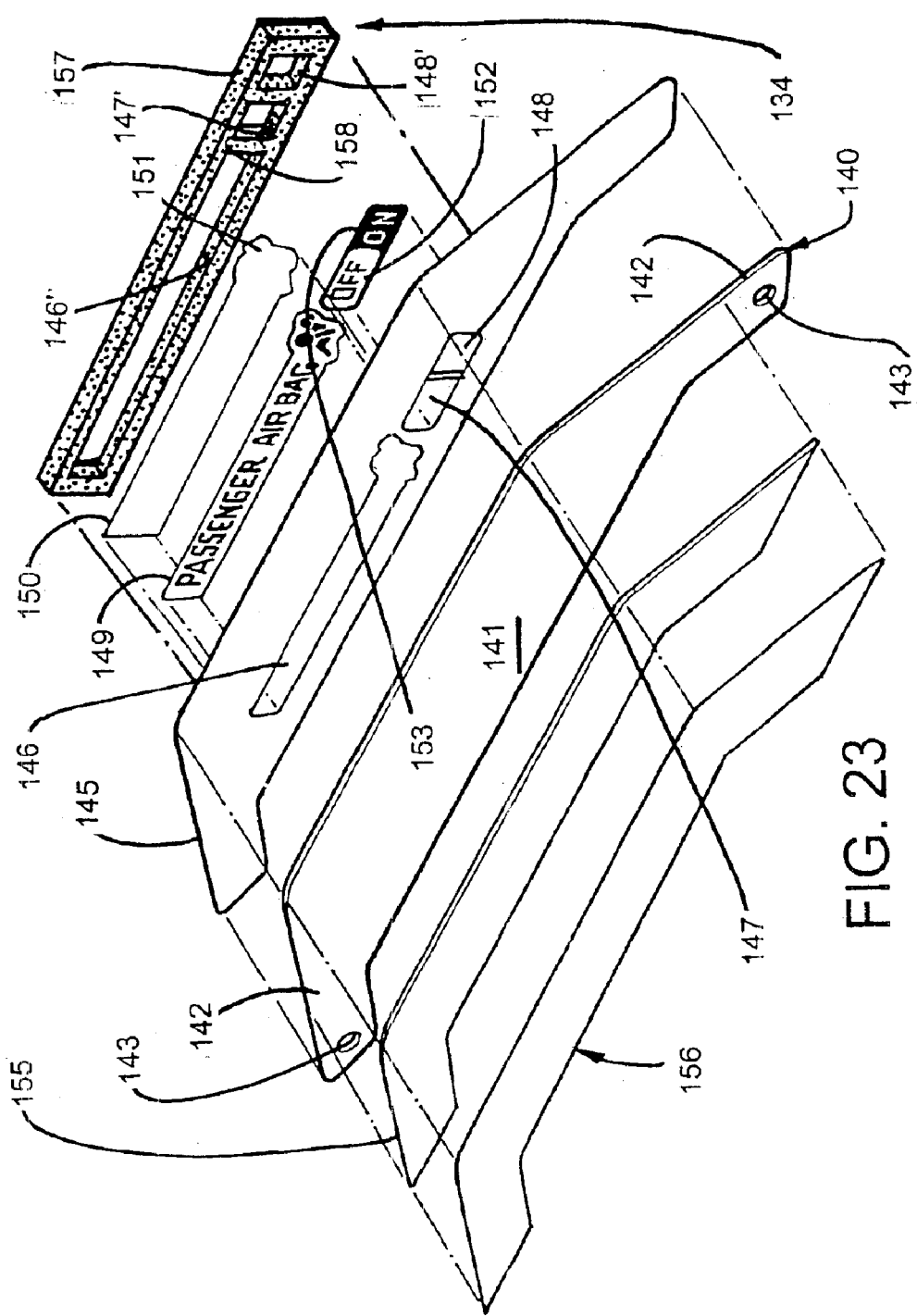
FIG. 23 is an exploded perspective view of the indicia panel shown in FIG. 19.

The illustrated electrochromic mirror subassembly 120 is commonly referred to as a fourth surface reflector, but it is contemplated that the present invention will work well with third surface reflectors and with other mirror constructions. Accordingly, it is contemplated that a scope of the present invention includes all such mirror constructions and the present description should not be construed as unnecessarily limiting. The illustrated mirror subassembly 120 (FIG. 25) includes front and rear transparent elements 121 and 122 (e.g., glass), electrically conductive layers 123 and 124 on inner surfaces of the transparent elements 121 and 122, respectively, a layer of electrochromic material 125 located between the conductive layers 123 and 124, and a reflective layer 126 on a rear surface of the rear transparent element 122 (i.e., the "fourth" surface of the mirror subassembly 120). A seal 125' extends around an inside perimeter of the transparent elements 121 and 122 to retain the electrochromic material 125, when the electrochromic material 125 is a liquid-phase type, or gel-phase type, or a hybrid of same. (It is noted that a perimeter edge striping may be applied to transparent elements 121 and 122 for aesthetics, which results in a similar appearance.) A portion of the reflective layer 126 is etched away or otherwise removed to define an elongated opening 127 (FIG. 18). The indicia panel 130 is adhered to the reflector layer 126 in a location where it covers the opening 127. Light sources 129 are positioned behind the indicia panel 130 to pass light through the indicia panel 130 and through the opening 127 of the electrochromic mirror subassembly 120 to selectively illuminate detailed symbols and information on the indicia panel 130 for viewing by a vehicle driver or passengers. A foam light seal 134 on the indicia panel 130 is located between the printed circuit board 119 and the indicia panel 130, and is shaped (see FIG. 16) to sealingly engage the printed circuit board 119 and the indicia panel 130 to prevent light leakage around the indicia panel 130. Specifically, the foam light seal 134 (i.e., a baffle subassembly) defines multiple windows 146'–148' (FIG. 23) engaging the indicia panel 130 for containing light from each of the light sources 129 (FIG. 17) as each window area is illuminated. The housing 116 and the bezel 117 snap together and are shaped to compress together the mirror subassembly 120, the indicia panel 130, the printed circuit board 119, and the light seal 134, thus compressing the light seal 134 to assure good contact by the light seal 134.

It is contemplated that the present invention includes many different indicia panels constructed with light-absorbing material to absorb undesired stray light and reflections, and also constructed with locator tabs and locator features. The illustrated indicia panel 130 (FIG. 23) includes a body panel 140 of light-passing translucent or transparent material, such as a mylar sheet, having a rectangular main section 141 and down-angled tabs 142 at each end. The body panel 140 includes a front surface treated to minimize the degree to which it will show fingerprints, as known in the art. A locating feature or locator hole 143 is formed in each tab 142. The holes 143 are configured to engage locator protrusions on a fixture (not specifically shown, but see FIG. 23) for providing very accurate alignment of the indicia panel 130 on the mirror subassembly 120 when the indicia panel 130 is adhered to a rear surface of the mirror subassembly 120. The locator holes 143 are further configured to engage a pair of locator protrusions 170 on the bezel 117 to very accurately locate the mirror subassembly 120 (including the indicia panel 130) in the bezel 117 and mirror housing 116, as described below. When adhesive layer 55 is eliminated, the locator holes engage the protrusions 170 for alignment of the indicia panel 130, while other structure on the housing 116 and bezel 117 align the mirror subassembly 120.

A light-absorbing layer 145 of ink, film, paint, or the like is applied to a back surface of the body panel 140. The light-absorbing (i.e., opaque) layer 145 accurately forms relatively small and well-defined windows 146–148 on the body panel 140. One or more layers of semitransparent or translucent material 149–153 (i.e. non-opaque) are applied onto the body panel 140 in the area of windows 146–148 to form the indicia of the present visual display. It is contemplated that the materials 149–153 have properties allowing them to be accurately applied to form detailed symbols, such as by known printing and symbol forming, film applying processes. For example, it is contemplated that the ink could be applied by a multi-coating printing process, or even by an ink-jet printer or copying/duplicating machine. The illustrated black material 149 includes apertures that form clear lettering. The layer 150 is applied behind the clear lettering and is translucent white, such that the words "PASSENGER AIR BAG" appear when the window 146 is luminated. The material 151 is also white and shows through as a symbol of a person with an air bag inflated in front of the person, but it is contemplated that the material 151 could of course be colored (e.g., orange or red) to highlight and distinguish the symbol. The materials 152 and 153 form letters for the words "on" and "off," which are visible only when the individual window 147 or window 148 are luminated.

In the illustrated indicia panel 130, an elongated layer 155 (FIG. 23) of adhesive having a small vertical dimension is applied to a face of the body panel 140 along an upper edge above the windows 146–148, with ends of the layer 155 extending partially downwardly along an upper edge of the down-angled tabs 142 to form a concavely shaped adhering area on three sides of the indicia forming the visible display. This concave arrangement helps avoid trapping air when adhering the indicia panel 130 to the mirror subassembly 120. It also helps reduce thermal expansion problems by providing an area in which the body panel 140 can expand or flex. The adhesive layer 155 is covered with a release paper 156 to protect the adhesive during shipping and handling prior to assembly.

Seal 134 (FIG. 23) includes a piece of compressible foam 157 and further includes an adhesive-covered face 158 that adheringly attaches to a back of the light-absorbing layer 145 on the body panel 140 of the indicia panel 130. The compressible foam 157 has windows 146'–148' cut into the foam that align with the windows 146–148 in the light-absorbing layer 145.

The bezel 117 (FIGS. 17 and 18) is generally oval shaped and configured to surround and mateably receivingly engage a perimeter of the mirror subassembly 120. A lower horizontal section (FIG. 16) of the bezel 117 includes upper and lower portions 161 and 162 that form a window for receiving finger-actuable switches or buttons 160 on the mirror 115. That portion of the bezel 117 that engages the perimeter of the mirror subassembly 120 includes a rearwardly extending inside section 163 that engages a face of the front transparent element 121, an aesthetically shaped front or transition area 164, and a rearwardly extending outer side section 165 that extends at least to a position adjacent an edge of the mirror subassembly 120. That portion of the bezel 117 that engages the housing 116 includes a rearwardly extending leg or flange 166 defining an outwardly facing cavity 167. The housing 116 includes a forwardly extending section 168 that fits into the cavity 167 and overlappingly engages the leg 166. The bezel 117 includes a hook-shaped connector 169 (FIG. 17) that is constructed to frictionally snap attach into a recess 169' in the housing 116. Guide fingers 169" extend from housing 116 at locations adjacent the hook-shaped connectors 169. The fingers 169" are shaped to engage a back surface of the flange 166 in a manner that forces the hook-shaped connector 169 into secure engagement with the recess 169'. It is contemplated that the hook-shaped connector 169 and the recess 169' can be reversed on the housing 116 and the bezel 117, or that they can be replaced with other connection means, such as screws, mechanical fasteners, adhesive, sonic welding, and the like.

Figure 27:
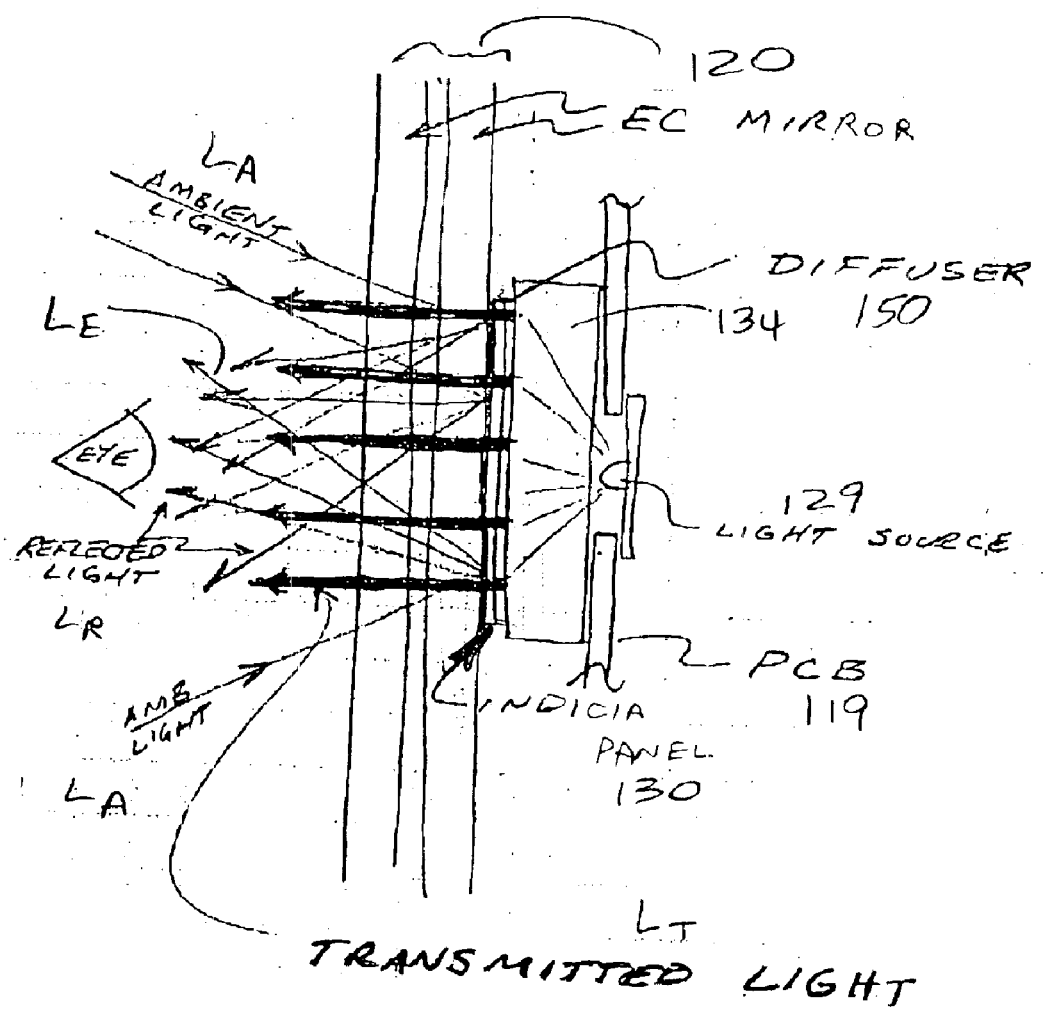
FIG. 27 is a cross sectional view similar to FIGS. 16, 25, and 26.

FIG. 27 shows a condition that occurs during daylight. As discussed below, an optimal arrangement occurs for viewing/reading the alphanumeric information when a color of the indicia panel 130 is the same as the color of the light from the light source 129. In particular, amber color has been shown to result in an optimal brightness and distinctiveness of the alphanumeric image that is exceptionally readable, even at reduced power or the light source 129, as discussed below.

The eye sees both ambient reflected light La and transmitted light $L_T$ from the desired amber light source according to the following formula:

$L_E = L_R + L_T$ (Where $L_E$ = Total light entering eye; $L_R$ = Reflected light; and $L_T$ = Transmitted light)

$L_T$ = a constant such as about 500 to 900 cd/m$^2$ as $L_R$ approaches infinity, then $L_E = L_R$ Therefore, the brighter the ambient light, the more the eye reads the color of the printing as opposed to the color of the transmitted light. Also, as the ambient reflected light $L_R$ increases, and if the alphanumeric information, symbols, and printing are white (i.e. different than the transmitted light), hot spots tend to be accentuated. This is because the eye starts to see more reflected light $L_R$ at some points on the indicia and more transmitted light $L_T$ at the hot spots. If the color of the reflected light is matched to the transmitted light, then the eye sees transmitted and/or reflected light as looking the same. Therefore, "hot spots" tend to be less noticeable or eliminated. A further benefit has been found in that amber light having an $L_T$ of 500–900 cd/m$^2$ is visible and readable in the daytime. Where a current design calls for white printing, the customer usually requires the transmitted light to be at least 500–900 cd/m$^2$, so that $L_T$ is much greater than $L_R$ for most daytime driving conditions. As it turns out, very bright sunny days can cause $L_R$ to be 1400+cd/m$^2$, which is significant and potentially overwhelming to the eye relative to $L_T$ even at 500–900 cd/m$^2$.

Testing has shown that nighttime LA needs to be in the range of 5 to 20 cd/m$^2$ (at night, $L_R$ 0 so $L_E = L_T$).

In the current design, it is difficult to provide a large dynamic range. Dynamic range is a ratio of daytime to nighttime brightness used herein to mathematically represent the range of brightness of the alphanumeric information that is generated. The following formula represents, by example, a desired dynamic range where $L_E$ daytime=500 cd/m$^2$:

$$\frac{L_E \text{ daytime}}{L_E \text{ nightime}} = \frac{500 \text{ cd}/m^2}{5 \text{ cd}/m^2} = 100:1 \text{ dynamic range}$$

At 500 cd/m$^2$ daytime, 20 cd/m$^2$ is about as low as you can get at night with simple electronics. This results in a dynamic range as follows:

$$\frac{L_E \text{ daytime}}{L_E \text{ nightime}} = \frac{500}{20} = 25{:}1 \text{ dynamic range}$$

If you desire 5 cd/m² at night with 25:1 dynamic range and with simple electronics, since 5 cd/m²×25=125 cd/m², this would result in a daytime light $L_T$ of 125 cd/l² daytime. At $L_T$=125 cd/m² daytime, $L_R$ quickly overpowers $L_T$ and you get an undesirable appearance or "wash-out" of the alphanumeric information on the indicia panel 130.

However, due to the constant color and constant contrast of the color (e.g. amber) to the rest of the indicia panel 130, if the printing color of layer 150 is matched to the transmitted color of the light source 129, you can use much less transmitted light during the day and produce the following benefits: Lower power usage by as much as about 30% to 50%; wider angle output LED's, improving light spreading or evenness; lower nighttime $L_T$ using simple electronics; lower cost or fewer LED's; and improved (consistent) appearance of information regardless of ambient light levels.

These benefits are believed to be surprising and unexpected, and are a direct result of matching the color of the diffuser 150 and/or the indicia panel 130 with the color of the light from light source 129. This "color-matched" arrangement is believed to be inventive, novel, and non-obvious over known prior art.

The bezel 117 (FIG. 18) includes a pair of rearwardly protruding locator protrusions 170 spaced on either side of the indicia panel 130. The protrusions 170 are shaped to engage the holes 143 on the tabs 142 to accurately locate the indicia panel 130 relative to the bezel 117. This is very important because the indicia (i.e., the lettering and symbols) on the indicia panel 130 must be very accurately aligned with the bezel 117 to avoid the appearance of misalignment and poor quality. Since the indicia panel 130 is accurately adhered to the mirror subassembly 120, the protrusions 170 cause the mirror subassembly 120 (including the visible interior of the seal 134) to also be accurately aligned with the bezel 117.

Notably, it is specifically contemplated that adhesive layer 155 can be eliminated. In such case, the protrusions 170 accurately locate the indicia panel 130, while ribs and other structure of the housing 116 and bezel 117 accurately locate the mirror subassembly 120.

The printed circuit board 119 (FIG. 18) includes locator apertures or holes 173 that also engage the protrusions 170 to accurately locate the printed circuit board 119. The illustrated light sources 129, which can be any suitable type of illuminator, such as LED, LCD, vacuum-fluorescent elements, icandescent lights, or the like, are mounted to the printed circuit board 119. Nonetheless, it is contemplated that the light sources 129 could be mounted behind the printed circuit board 119 and shine through windows in the printed circuit board 119. Switches 160 are also mounted to the printed circuit board 119 in a position where they align with lower windows in the bezel 117, and where they are easy to operate by a seated driver.

Figure 15:
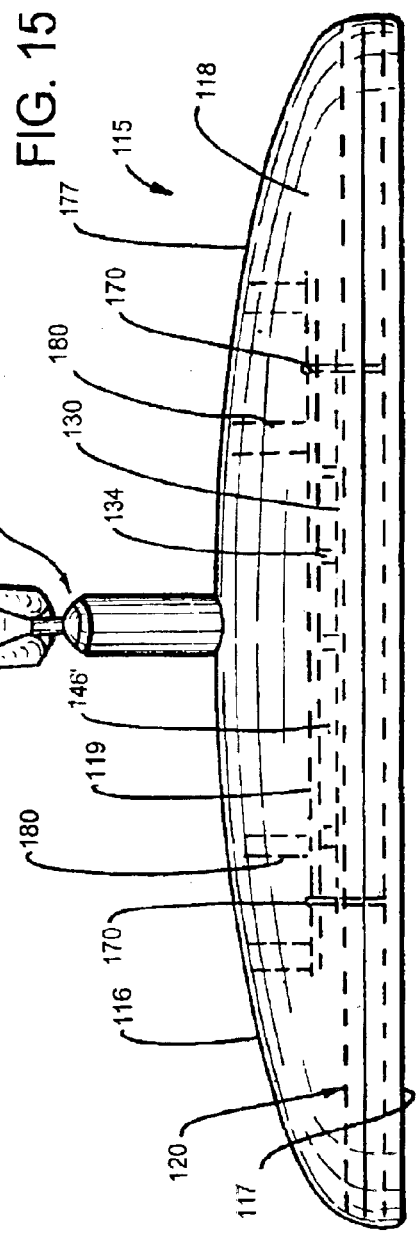

The housing 116 (FIG. 17) includes sidewalls 176 having the recesses 169' and guide fingers 169" that receive the hook-shaped connectors 169, and further include a back wall 177. The back wall 177 includes mounting structure 178 for operably adjustably engaging the vehicle ball mount 179 (FIG. 15). Projections 180 (FIG. 16) extend forwardly from the back wall 177 into abutting engagement with the printed circuit board 119. When assembled, the bezel 117 snap attaches to the housing 116 to compress together the mirror subassembly 120, the indicia panel 130, the printed circuit board 119, and the light seal 134 in a compressed sandwich-like arrangement, with the light seal 134 lightly compressed.

Figure 24:
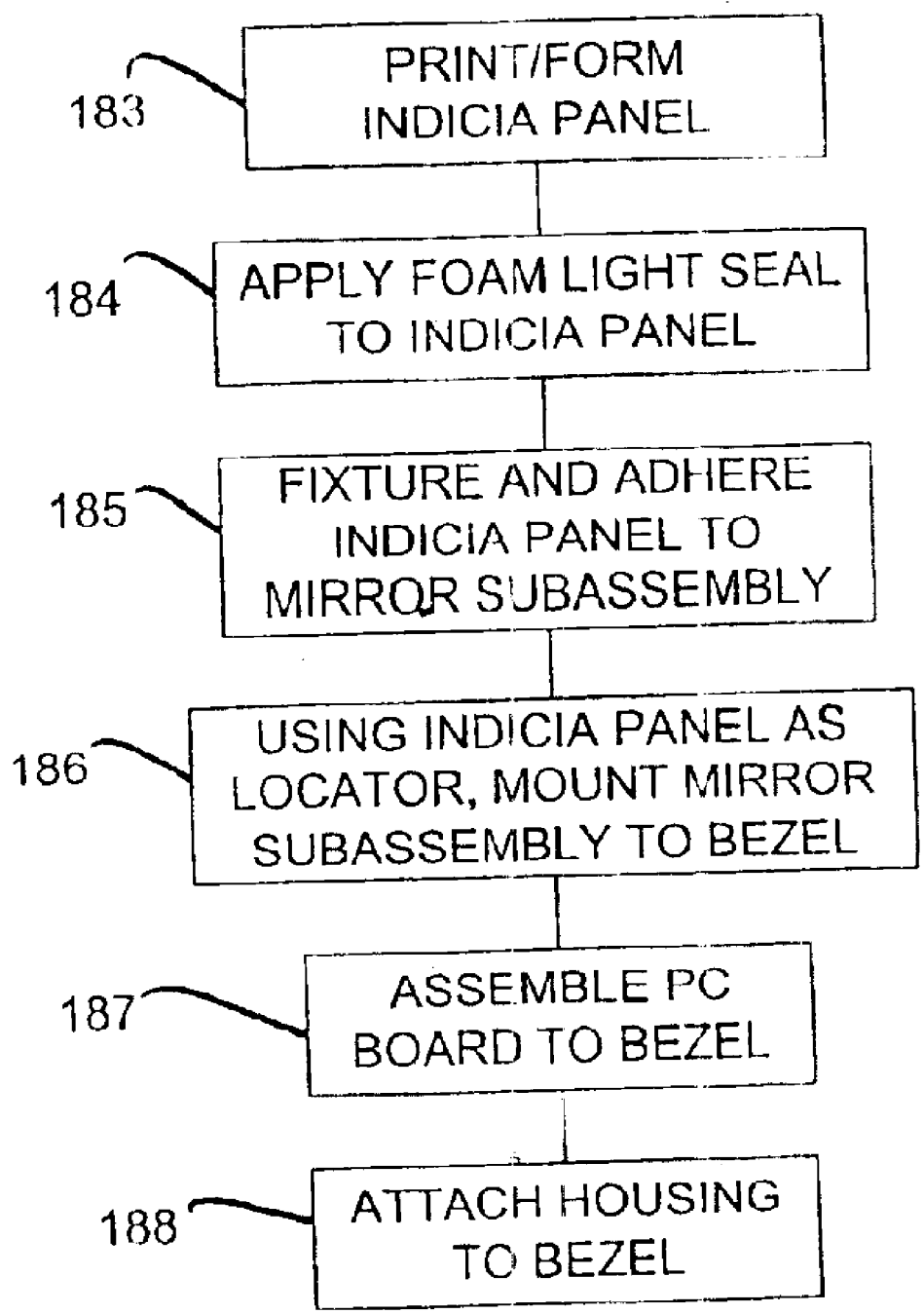
FIG. 24 is a flow chart showing a manufacturing method for assembling the mirror shown in FIG. 14.

As shown by FIG. 24, the method of assembly includes printing and forming the indicia panel 130 in a step 183, and then adhering the foam light seal 134 to the indicia panel 130 in a step 184. In a step 185, the mirror subassembly 120 is fixtured by fixtured engagement of its locator holes 143, and the indicia panel 130 is accurately attached to the mirror subassembly 120 (if adhesive is used) by removing the release paper 156 and by adhering the adhesive 155 to a rear surface of the rear transparent element 122 as the indicia panel 130 is accurately held. The indicia panel 130 is then used to accurately locate the mirror subassembly 120 to the bezel 117 by registering the holes 143 on the protrusions 170 of the bezel 117 in a step 186. Alternatively, where adhesive layer 155 is eliminated, protrusions 170 engage holes 143 to locate the indicia panel 130, but the mirror subassembly 120 is located by engagement with the bezel 117 and housing 116. The printed circuit board 119 is also accurately located by registering its holes 173 on the protrusions 170 in a step 187. The housing 116 is snap attached to the bezel 117 in step 188. This causes the abutting projections 180 on the housing 116 to engage the printed circuit board 119, compressing the foam light seal 134 between the printed circuit board 119 and the indicia panel 130, and compressing the indicia panel 130 with light pressure against the mirror subassembly 120. This light pressure helps hold the indicia panel 130 against the mirror subassembly 120, yet permits dimensional variation during assembly. This arrangement also allows the expansion and contraction that occurs during thermal cycling of the mirror 115 while in service.

Figure 25:
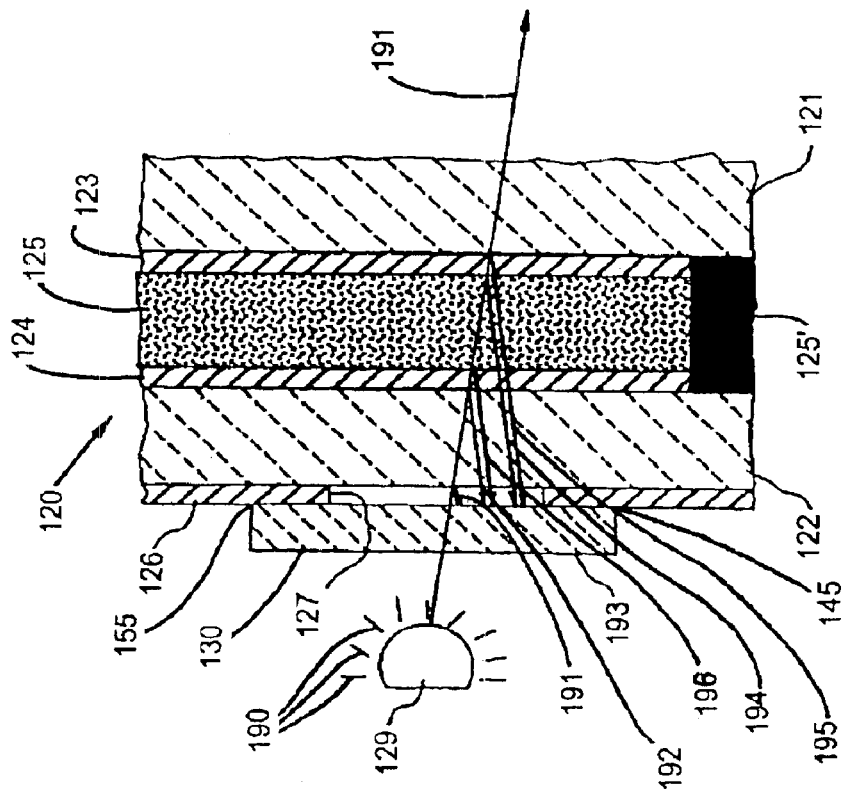
FIG. 25 is a schematic side cross section similar to FIG. 3, but showing undesirable secondary light reflections in the embodiment of FIG. 14.

One important benefit of using a light-absorbing indicia panel 130 is shown in FIG. 25. The light source 129 emits light 190, a primary portion 191 of which travels through the indicia panel 130, through the opening 127, and out through various components of the mirror subassembly 120 to a viewing person. Secondary reflections 192–196 occur at a rear surface of 10 the rear transparent element 122, and at each interface between the layers 122/124, 124/125, 125/123, and 123/121. These secondary reflections 192–195 are absorbed by the light-absorbing layer 145 on the indicia panel 130. This arrangement greatly reduces unwanted stray light. The size of each window 146–148 and windows 146'–148' (see FIGS. 16–18 and 23), and also the size of the opening 127 (FIG. 25), are chosen to optimize the clarity of the image projected by primary light portion 191 without detracting from the reflected images of the mirror 115. In a preferred form, the vertical dimension of the letters and symbols is about 25 percent to about 75 percent, or more preferably about 50 percent, of the vertical dimension of the opening 127.

It is noted that mirror subassemblies 120 having the same size opening 127 can be used in mirrors 115 having different options. For example, a different indicia panel 130 can be used along with different printed circuit boards 119, while still using the same bezel 117, housing 116, and mirror subassembly 120. This greatly facilitates manufacturing high volumes of mirror subassemblies 120 while still allowing for a maximum of options. Further, the same housing 116 and mirror subassembly 120, can be used, while using a different bezel 117. This is an important advantage since the mirror subassembly 120 is one of the more expensive components of the mirror 115. It is important to have the mirror subassembly 120 be at a higher volume to optimize automation of the manufacturing process and to minimize costs.

Figure 26:
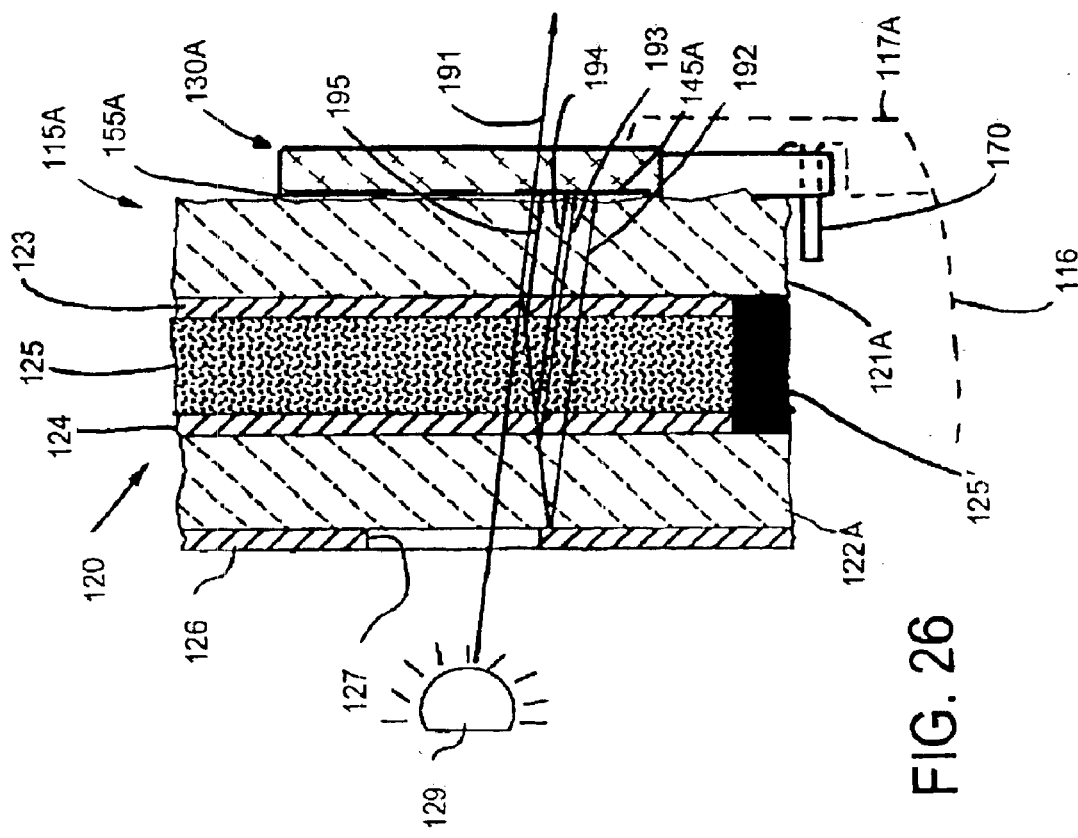
FIG. 26 is a schematic side cross section similar to FIG. 25, but showing an embodiment where the indicia panel is attached to a front of the mirror subassembly and under the front bezel.

It is specifically contemplated that aspects of the present invention can be utilized advantageously in different mirror constructions. One such mirror is illustrated in FIG. 26, and includes a front-mounted indicia panel 130A adheringly attached to a front surface of the front transparent element 121A. In mirror 115A, components and features that are identical or similar to the features and components of mirror 115 are identified by the same number.

In mirror 120A, the indicia panel 130A is adhered to the front surface using adhesive 155A, and the light-absorbing layer 145A is located adjacent the adhesive 155A. Notably, it is contemplated that the adhesive Would be omitted where the indicia panel 130A is adequately supported by portions of the bezel 117A. It is also contemplated that the light-absorbing layer 145A could be positioned on the other side of the indicia panel 130A or even on any of the front or rear surfaces of the transparent elements 121A and 122A. The indicia panel 130A provides many of the advantages noted above, including fixturing advantages, good appearance, low cost, and a flexible part that can be used in mirrors having different options.

In the foregoing description, it will be readily appreciated by those skilled in the art that modifications may be made to the invention without departing from the concepts disclosed herein. Such modifications are to be considered as included in the following claims, unless these claims by their language expressly state otherwise.

What is claimed is:

1. A mirror comprising:
a housing:
a mirror subassembly including a reflector layer with a portion defining an opening;
panel covering the opening, said panel configured to form a visual display of indicia, the indicia having a characteristic color; and
at least one light source positioned in the housing to emit light through the indicia on the panel and through the opening of the mirror subassembly to selectively illuminate the indicia, the at least one light source emitting a light matched in color to the characteristic color of the indicia.

2. The mirror defined in claim 1, wherein the mirror subassembly includes an electrochromic mirror subassembly, the electrochromic mirror subassembly including front and rear transparent elements, and a layer of electrochromic material associated with the front and rear transparent elements, the reflector layer being associated with the rear transparent element.

3. The mirror defined in claim 1, wherein the indicia on the panel includes alphanumeric characters.

4. The mirror defined in claim 1, wherein the color of the at least one light source is non-white.

5. The mirror defined in claim 4, wherein the color is amber.

6. The mirror as defined in claim 1, wherein she indicia on the panel includes symbols defining a supplemental inflatable restraint status display.

7. The mirror defined in claim 1, wherein the panel comprises a translucent diffuser layer having the characteristic color of the indicia, and an opaque layer selectively applied over the diffuser layer so as to define an outline of the indicia and thereby absorb light from that otherwise not emitted through the indicia.

8. The mirror defined in claim 1, wherein the panel comprises a light absorbing background having a color that is visually distinguishable over the characteristic color of the indicia such that the indicia is viewable in its characteristic color even when no light from the at least one light source is emitted therethrough.

9. A mirror comprising:
a housing:
a mirror subassembly including a reflector layer with a portion defining an opening;
an indicia panel covering the opening and configured to form a visual display having a characteristic color; and
at least one light source positioned in the housing to pass light through the indicia panel and the opening of the mirror subassembly to selectively illuminate the visual display, the at least one light source emitting a light matched in color to the characteristic color of the visual display of the indicia panel, wherein the color of the at least one light source is non-white, wherein the panel includes a diffuser layer having a color matching the at least one light source.

10. A vehicle rearview mirror assembly comprising:
a housing;
a mirror subassembly disposed in said housing and including at least one transparent element and a reflector layer associated with said at least one transparent element, a portion of said reflector layer defining an opening; and
a passenger supplemental inflatable restraint display for displaying the enablement status of passenger supplemental inflatable restraint, said display comprising:
an indicia panel disposed in said housing behind said mirror subassembly so as to cover the opening in said reflector layer, said indicia panel including an opaque region and a plurality of substantially non-opaque regions defining a plurality of indicia symbols, said plurality of indicia symbols including a first indicia symbol, a second indicia symbol, and a third indicia symbol, wherein at least one of said substantially non-opaque regions define said first indicia symbol and has an amber color, and wherein said indicia symbols include alphanumeric letters; and
a plurality of light sources positioned in said housing to transmit amber colored light through said substantially non-opaque regions of said indicia panel and through said mirror subassembly to selectively display the illuminated indicia symbols, wherein said plurality of light sources includes at least a first light source associated with said first indicia symbol, a second light source associated with said second indicia symbol, and a third light source associated with said third indicia symbol, said first, second, and third light sources are independently activated from one another so as to independently illuminate said first, second, and third indicia symbols; and
a baffle subassembly disposed relative to said light sources and said indicia panel such that light from said first light source does not illuminate said second and third indicia symbols, light from said second light source does not illuminate said first and third indicia symbols, and light from said third light source does not illuminate said first and second indicia symbols.

11. The vehicle rearview mirror assembly of claim 10, wherein said first indicia symbol includes a plurality of alphanumeric letters spelling the words "PASSENGER AIR BAG."

12. The vehicle rearview mirror assembly of claim 11, wherein said second indicia symbol includes a plurality of alphanumeric letters spelling the word "OFF."

13. The vehicle rearview mirror assembly of claim 12, wherein said third indicia symbol includes a plurality of alphanumeric letters spelling the word "ON."

14. The vehicle rearview mirror assembly of claim 13, wherein said first light source includes a plurality of LEDs.

15. The vehicle rearview mirror assembly of claim 14, wherein said indicia panel includes at least one registration hole and wherein said housing includes at least one registration protrusion for engaging said registration hole.

16. The vehicle rearview mirror assembly of claim 14, wherein said indicia panel includes two registration holes and wherein said housing includes two registration protrusions for respectively engaging said registration holes.

17. The vehicle rearview mirror assembly of claim 16, wherein said housing includes a bezel and wherein said two registration protrusions protrude from said bezel.

18. The vehicle rearview mirror assembly of claim 17 and further comprising a printed circuit board disposed in said housing substantially parallel to a rear surface of said mirror subassembly, wherein said light sources include LEDs that are surface mounted to said printed circuit board.

19. The vehicle rearview mirror assembly of claim 18, wherein said mirror subassembly is an electrochromic mirror subassembly.

20. The vehicle rearview mirror assembly of claim 10, wherein said indicia panel includes at least one registration hole and wherein said housing includes at least one registration protrusion for engaging said registration hole.

21. The vehicle rearview mirror assembly of claim 10, wherein said mirror subassembly is an electrochromic mirror subassembly.

22. A rearview mirror assembly for a vehicle, comprising:
   a housing:
      a mirror subassembly including a reflector layer with a portion defining an opening;
      a panel covering the opening the panel configured to form a visual display of indicia, the indicia having a characteristic color;
      a printed circuit board disposed in said housing substantially parallel to a rear surface of said mirror subassembly; and
      a plurality of LEDs positioned in the housing that are mounted to said printed circuit board to emit light through the indicia on the panel and through the opening of the mirror subassembly to selectively illuminate the indicia, said plurality of LEDs emitting light matched in color to the characteristic color of the indicia.

* * * * *

UNITED STATES PATENT AND TRADEMARK OFFICE
CERTIFICATE OF CORRECTION

PATENT NO. : 6,870,655 B1
DATED : March 22, 2005
INVENTOR(S) : Bradley L. Northman et al.

It is certified that error appears in the above-identified patent and that said Letters Patent is hereby corrected as shown below:

Column 1,
Line 21, "Modem" should be -- Modern --.

Column 4,
Line 5, "XXI-XXI" should be -- XXII-XXII --.

Column 6,
Line 32, delete "25".

Column 9,
Line 51, "(FIGS. 14 and 15) a" should be -- (FIGS. 14 and 15) --.

Column 12,
Line 23, "La" should be -- $L_R$ --.
Line 51, "LA" should be -- $L_E$ --.

Column 14,
Line 37, delete "10".

Column 15,
Line 7, "mirror 120A" should be -- mirror 115A --.
Line 10, "Would" should be -- 145A could --.
Line 31, "panel" should be -- a panel --.
Line 53, "she" should be -- the --.

UNITED STATES PATENT AND TRADEMARK OFFICE
CERTIFICATE OF CORRECTION

PATENT NO. : 6,870,655 B1
DATED : March 22, 2005
INVENTOR(S) : Bradley L. Northman et al.

It is certified that error appears in the above-identified patent and that said Letters Patent is hereby corrected as shown below:

Column 16,
Lines 29-30, "nor-opaque" should be -- non-opaque --.

Signed and Sealed this

Fourth Day of October , 2005

JON W. DUDAS
*Director of the United States Patent and Trademark Office*